US009874760B2

United States Patent
Hua et al.

(10) Patent No.: US 9,874,760 B2
(45) Date of Patent: Jan. 23, 2018

(54) STEREOSCOPIC DISPLAYS WITH ADDRESSABLE FOCUS CUES

(71) Applicant: THE ARIZONA BOARD OF REGENTS ON BEHALF OF THE UNIVERSITY OF ARIZONA, Tucson, AZ (US)

(72) Inventors: Hong Hua, Tucson, AZ (US); Xinda Hu, Sunnyvale, CA (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 7 days.

(21) Appl. No.: 14/435,328

(22) PCT Filed: Oct. 17, 2013

(86) PCT No.: PCT/US2013/065422
§ 371 (c)(1),
(2) Date: Apr. 13, 2015

(87) PCT Pub. No.: WO2014/062912
PCT Pub. Date: Apr. 24, 2014

(65) Prior Publication Data
US 2015/0277129 A1    Oct. 1, 2015

Related U.S. Application Data

(60) Provisional application No. 61/795,500, filed on Oct. 18, 2012.

(51) Int. Cl.
G02B 27/22    (2006.01)
G02B 27/01    (2006.01)
(Continued)

(52) U.S. Cl.
CPC .......... *G02B 27/22* (2013.01); *G02B 17/086* (2013.01); *G02B 27/0101* (2013.01);
(Continued)

(58) Field of Classification Search
CPC ................ G02B 27/2214; G02B 27/22; G02B 27/0172; G02B 17/086; G02B 27/106;
(Continued)

(56) References Cited

U.S. PATENT DOCUMENTS 3,992,084 A    11/1976    Nakamura
4,669,810 A    6/1987    Wood
(Continued)

FOREIGN PATENT DOCUMENTS

CN    1252133 A    5/2000
CN    101359089 A    2/2009
(Continued)

OTHER PUBLICATIONS

US 9,207,443, 12/2015, Cheng (withdrawn)
(Continued)

*Primary Examiner* — Bumsuk Won
*Assistant Examiner* — Henry Duong
(74) *Attorney, Agent, or Firm* — Niels Haun; Dann, Dorfman, Herrell and Skillman, P.C.

(57) ABSTRACT

The present invention relates generally to stereoscopic displays, and more particularly, but not exclusively, to stereoscopic displays with addressable focus cues. A stereoscopic display system with the addressable focus cues, comprises: a microdisplay for providing a virtual image for display to a user; a reflective active optical element configured to provide a variable optical power; a relay lens disposed along an optical path between the microdisplay and the active optical element, the relay lens positioned therebetween such that the microdisplay and the active optical element are
(Continued)

disposed at conjugate planes of the relay lens; a beamsplitter disposed along the optical path between the microdisplay and the active optical element at an orientation to receive optical radiation from the active optical element; and a see-through eyepiece comprising a selected surface configured to receive optical radiation from the beamsplitter and reflect the received radiation to an exit pupil of the system to provide a virtual display path, the selected surface also configured to receive optical radiation from a source other than the microdisplay and to transmit such optical radiation to the exit pupil to provide a see-through optical path.

9 Claims, 21 Drawing Sheets

(51) Int. Cl.
H04N 13/04 (2006.01)
G02B 27/10 (2006.01)
G02B 17/08 (2006.01)
(52) U.S. Cl.
CPC ........ G02B 27/0172 (2013.01); G02B 27/106 (2013.01); H04N 13/044 (2013.01); H04N 13/0436 (2013.01); G02B 2027/011 (2013.01); G02B 2027/0132 (2013.01); G02B 2027/0134 (2013.01)
(58) Field of Classification Search
CPC ........ G02B 27/0101; G02B 2027/0132; G02B 2027/011; G02B 2027/0134; H04N 13/0404; H04N 13/0497; H04N 13/0409; H04N 13/0055; H04N 13/0436; H04N 13/044
USPC ........................................ 359/462
See application file for complete search history.

(56) References Cited

U.S. PATENT DOCUMENTS

| | | | |
|---|---|---|---|
| 4,753,522 A | 6/1988 | Nishina |
| 4,863,251 A | 9/1989 | Herloski |
| 5,172,272 A | 12/1992 | Aoki |
| 5,172,275 A | 12/1992 | Dejager |
| 5,526,183 A | 6/1996 | Chen |
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi et al. |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,243,199 B1 | 6/2001 | Hansen |
| 6,271,972 B1 | 8/2001 | Kedar |
| 6,384,983 B1 | 5/2002 | Yamazaki |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,239,453 B2 | 1/2016 | Cheng |
| 9,310,591 B2 | 4/2016 | Hua |
| 2001/0009478 A1 | 7/2001 | Yamazaki |
| 2002/0015116 A1 | 2/2002 | Park |
| 2002/0060850 A1 | 5/2002 | Takeyama |
| 2003/0076591 A1 | 4/2003 | Ohmori |
| 2003/0090753 A1 | 5/2003 | Takeyama |
| 2004/0196213 A1 | 10/2004 | Tidwell |
| 2004/0233551 A1 | 11/2004 | Takahashi |
| 2005/0036119 A1 | 2/2005 | Ruda |
| 2005/0248849 A1 | 11/2005 | Urey |
| 2006/0119951 A1 | 6/2006 | McGuire |
| 2008/0094720 A1 | 4/2008 | Yamazaki |
| 2008/0291531 A1 | 11/2008 | Heimer |
| 2009/0115842 A1 | 5/2009 | Saito |
| 2009/0168010 A1 | 7/2009 | Vinogradov |
| 2010/0109977 A1 | 5/2010 | Yamazaki |
| 2011/0037951 A1 | 2/2011 | Hua |
| 2011/0043644 A1 | 2/2011 | Munger |
| 2011/0075257 A1 | 3/2011 | Hua |
| 2011/0090389 A1 | 4/2011 | Saito |
| 2011/0221656 A1 | 9/2011 | Haddick et al. |
| 2012/0019557 A1 | 1/2012 | Aronsson |
| 2012/0057129 A1 | 3/2012 | Durnell |
| 2012/0081800 A1* | 4/2012 | Cheng ............... G03B 21/00 359/720 |
| 2012/0113092 A1 | 5/2012 | Bar-Zeev |
| 2012/0160302 A1 | 6/2012 | Citron |
| 2012/0162549 A1 | 6/2012 | Gao |
| 2013/0112705 A1 | 5/2013 | McGill |
| 2013/0187836 A1 | 7/2013 | Cheng |
| 2013/0258461 A1 | 10/2013 | Sato |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0361957 A1 | 12/2014 | Hua |

FOREIGN PATENT DOCUMENTS

| | | |
|---|---|---|
| CN | 101424788 A | 5/2009 |
| EP | 1102105 | 5/2001 |
| JP | H09218375 A | 8/1997 |
| JP | H10307263 | 11/1998 |
| JP | H11326820 A | 11/1999 |
| JP | 2001066543 A | 3/2001 |
| JP | 2006276884 A | 10/2006 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2013112705 | 8/2013 |
| WO | 2014062912 | 4/2014 |

OTHER PUBLICATIONS

US 9,213,186, 12/2015, Cheng (withdrawn)
Armitage, David, Ian Underwood, and Shin-Tson Wu. Introduction to Microdisplays. Chichester, England: Wiley, 2006. Print.*
International Search Report and Written Opinion dated Nov. 24, 2015 in corresponding PCT application PCT/US2015/047163.

(56) References Cited

OTHER PUBLICATIONS

European Search Report dated Aug. 14, 2015 in corresponding EP application No. 13740989.2.
International Search Report dated Feb. 10, 2011 from PCT/CN2010/072376.
J. E. Melzer's: 'Overcoming the field-of-view/resolution invariant in head-mounted displays' Proc. SPIE vol. 3362, 1998, p. 284.
L. G. Brown's: 'Applications of the Sensics panoramic HMD' SID Symposium Digest vol. 39, 2008, p. 77.
M. Gutin: 'Automated design and fabrication of ocular optics' Proc. SPIE 2008, p. 7060.
Written Opinion dated Feb. 10, 2011 from PCT/CN2010/072376.
Zhang, R., et al., "Design of a Polarized Head-Mounted Projection Display using FLCOS Microdisplays", Proc. Of SPIE vol. 6489, 64890B-1. (2007).
GB Examination Report corresponding to GB 1012165.5 dated Jun. 28, 2011.
'Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998,
Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, C. Gao, F. Biocca, and J. P. Rolland, "An ultra-light and compact design and implementation of head-mounted projective displays," in Proceedings of IEEE VR 2001, pp. 175-182.
L. Hua,Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).

International Search Report dated Mar. 9, 2009 with regard to International Patent Application No. PCT/ US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence' Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Hua et al, "Compact eyetracked optical see-through head-mounted display", Proc. SPIE 8288, Stereoscopic Displays and Applications XXIII, 82881F (Feb. 9, 2012).
International Search Report dated Jun. 18, 2010 in corresponding international application PCT/US2010/031799.
Jisoo Hong, et al., "Three-dimensional display technologies of recent interest: Principles, Status, and Issues," Applied Optics (Dec. 1, 2011) 50(34):106.
Written Opinion dated Jun. 18, 2010 in corresponding international application PCT/US2010/031799.

(56) References Cited

OTHER PUBLICATIONS

Yamazaki et al, "Thin wide-field-of-view HMD with free-form-surface prism and applications", Proc. SPIE 3639, Stereoscopic Displays and Virtual Reality Systems VI, 453 (May 24, 1999).
Akeley et al., "A Stereo Display Prototype with Multiple Focal Distances," ACM Trans. Graphics 23:804-813 (2004).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Edgar et al., "Visual Accommodation Problems with Head-Up and Helmet-Mounted Displays?," Displays 15:68-75 (1994).
Favalora et al., "100 Million-Voxel Volumetric Display," Proc. SPIE 4712:300-312 (2002).
Graham-Rowe, "Liquid Lenses Make a Splash," Nature-Photonics pp. 2-4 (2006).
Heanue et al., "Volume Holographic Storage and Retrieval of Digital Data," Science 265:749-752 (1994).
Hua, "Merging the Worlds of Atoms and Bits: Augmented Virtual Environments," Optics and Photonics News 17:26-33 (2006).
Inoue et al., "Accommodative Responses to Stereoscopic Three-Dimensional Display," Applied Optics, 36:4509-4515 (1997).
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
"OLED-XL Microdisplays," eMagin 5 pages (2010).
Optical Research Associates, http://www.opticalres.com, 2 pages (obtained Jan. 26, 2011).
Rolland et al., "Multifocal Planes Head-Mounted Displays," Applied Optics 39:3209-3215 (2000).
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Watt et al., "Focus Cues Affect Perceived Depth," J Vision 5:834-862 (2005).
Love et al. (High Speed switchable lens enables the development of a volumetric stereoscopic display. Aug. 2009, Optics Express. vol. 17, No. 18, pp. 15716-15725.).
Hidenori Kuriyabashi, Munekazu Date, Shiro Suyama, Toyohiko HatadaJ. of the SID 14/5, 2006 pp. 493-498.
A. T. Duchowski, "Incorporating the viewers Point-Of-Regard (POR) in gaze-contingent virtual environments" , SPIE-Int. Soc. Opt. Eng. Proceedings of SPIE—the International Society for Optical Engineering, vol. 3295, 1998, pp. 332-343.
T. Ando, K. Yamasaki, M. Okamoto, and E. Shimizu, "Head Mounted Display using holographic optical element," Proc. SPIE, vol. 3293, 183 (1998).
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y. Wang, H. Hua, and M. M. Talha, "Design of an optical see-through head-mounted display with a low f-Number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
J. G. Droessler, D. J. Rotier, "Tilted cat helmet-mounted display," Opt. Eng., vol. 29, 849 (1990).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).
P. Gabbur, H. Hua, and K. Barnard, 'A fast connected components labeling algorithm for real-time pupil detection,' Mach. Vision Appl., 21(5):779-787, 2010.
Geisler, W.S., J.S. Perry and J. Najemnik, "Visual search: The role of peripheral information measured using gaze-contingent displays," J. Vision 6, 858-873 (2006).
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
Hua, H. "Integration of eye tracking capability into optical see-through head-mounted displays," Proceedings of SPIE (Electronic Imaging 2001), pp. 496-503, Jan. 2001.
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
J. P. Rolland, "Wide-angle, off-axis, see-through head-mounted display," Opt. Eng., vol. 39, 1760 (2000).
K. Iwamoto, K. Tanie, T. T. Maeda, "A head-mounted eye movement tracking display and its image display method" , Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system: -evaluation experiments of a protype sytem", Proceedings of 1994 IEEE International Conference on Systems, Man and Cybernetics. Humans. Information and Technology (Cat. No. 94CH3571-4). IEEE. Part vol. 1, 1994, pp. 13-18 vol. 1. New York, NY, USA.
Laurence R. Young, David Sheena, "Survey of eye movement recording methods" , Behavior Research Methods & Instrumentation, 7(5), 397-429, 1975.
Loschky, L.C. and Wolverton, G.S., "How late can you update gaze-contingent multiresolutional displays without detection?" ACM Trans. Mult. Comp. Comm. and App. 3, Nov. 2007.
M. D. Missig and G. M. Morris, "Diffractive optics applied to eyepiece design," Appl. Opt. 34, 2452-2461 (1995).

(56) References Cited

OTHER PUBLICATIONS

M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
O. Cakmakci, B. Moore, H. Foroosh, and J. P. Rolland, "Optimal local shape description for rotationally non-symmetric optical surface design and analysis," Opt. Express 16, 1583-1589 (2008).
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Wartenberg, Philipp, "EyeCatcher, the Bi-directional OLED Microdisplay," Proc. of SID 2011.
International Search Report dated Jan. 29, 2014 in corresponding international application PCT/US2013/065422.
Xinda Hu and Hong Hua, "High-resolution optical see-through multi-focal-plane head-mounted display using freeform optics," Optics Express,22(11): 13896-13903, Jun. 2014.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
R. Schulein, M. DaneshPanah, and B. Javidi, "3D imaging with axially distributed sensing," Journal of Optics Letters, vol. 34, Issue 13, pp. 2012-2014, Jul. 1, 2009.
K. Iwamoto, S. Katsumata, K. Tanie, "An eye movement tracking type head mounted display for virtual reality system: -evaluation experiments of a prototype system", Proceedings of 1994 IEEE International Conference on Systems, Man and Cybernetics. Humans, Information and Technology (Cat. No.94CH3571-5). IEEE. Part vol. 1, 1994, pp. 13-18 vol. 1. New York, NY, USA.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
C. Manh Do, R. Martínez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
S. Hong and B. Javidi, "Distortion-tolerant 3D recognition of occluded objects using computational integral imaging," Journal of Optics Express, vol. 14, Issue 25, pp. 12085-12095, Dec. 11, 2006.
Christopher M. Bishop, Neural Networks for Pattern Recognition, Oxford University Press, Inc. New York, NY 1995.
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
Yano, S., Emoto, M., Mitsuhashi, T., and Thwaites, H., "A study of visual fatigue and visual comfort for 3D HDTV/HDTV images," Displays, 23(4), pp. 191-201, 2002.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
G. Lippmann, "Epreuves reversibles donnant la sensation du relief," Journal of Physics (Paris) 7, 821-825 (1908).
C.B. Burckhardt, "Optimum parameters and resolution limitation of integral photography," J. Opt. Soc. Am. 58, 71-76 (1968).
T. Okoshi, "Optimum design and depth resolution of lens-sheet and projection-type three-dimensional displays," Appl. Opt. 10, 2284-2291 (1971).

F. Okano, H. Hoshino, J. Arai y I. Yuyama, "Real-time pickup method for a three-dimensional image based on integral photography," Appl. Opt. 36, 1598-1603 (1997).
J. Aran, "Depth-control method for integral imaging," Optics Letters, 33(3): 279-282, 2008.
Hua, "Sunglass-like displays become a reality with freeform optical technology," SPIE Newsroom, 2012.
H. Hua, X. Hu, and C. Gao, "A high-resolution optical see-through head-mounted display with eyetracking capability," Optics Express, Nov. 2013.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
Tibor Balogh, "The HoloVizio System," Proceedings of SPIE, VOl 6055, 2006.
Y. Takaki, Y. Urano, S. Kashiwada, H. Ando, and K. Nakamura, "Super multi-view winshield display for long-distance image information presentation," Opt. Express, 19, 704-16, 2011.
Blundell, B. G., and Schwarz, A. J., "The classification of volumetric display systems: characteristics and predictability of the image space," IEEE Transaction on Visualization and Computer Graphics, 8 (1), pp. 66-75, 2002.
Schowengerdt, B. T., and Seibel, E. J., "True 3-D scanned voxel displays using single or multiple light sources," Journal of SID, 14(2), pp. 135-143, 2006.
X. Hu and H. Hua, "Design and assessment of a depth-fused multi-focal-plane display prototype," Journal of Display Technology, Dec. 2013.
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
J. Hong, S. Min, and B. Lee, "Integral floating display systems for augmented reality," Applixed Optics, 51(18):4201-9, 2012.
A. Malmone, and H. Fuchs, "Computational augmented reality eyeglasses," Proc. of ISMAR 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
M. Martínez-Corral, H. Navarro, R. Martínez-Cuenca, G. Saavedra, and B. Javidi, "Full parallax 3-D TV with programmable display parameters," Opt. Phot. News 22, 50-50 (2011).
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.
J. S. Jang, F. Jin, and B. Javidi, "Three-dimensional integral imaging with large depth of focus by use of real and virtual image fields," Opt. Lett. 28:1421-23, 2003.
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
M. Lucente, "Interactive three-dimensional holographic displays: seeing the future in depth," Computer Graphics, 31(2), pp. 63-67, 1997.
P. A. Blanche, et al, "Holographic three-dimensional telepresence using large-area photorefractive polymer" , Nature, 468, 80-83, Nov. 2010.

(56) References Cited

OTHER PUBLICATIONS

G. Wetzstein et al., "Tensor Displays: Compressive light field synthesis using multilayer displays with directional backlighting," ACM Transactions on Graphics, 31(4), 2012.

J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.

R. Martínez-Cuenca, H. Navarro, G. Saavedra, B. Javidi, and M. Martínez-Corral, "Enhanced viewing-angle integral imaging by multiple-axis telecentric relay system," Optics Express, vol. 15, Issue 24, pp. 16255-16260, Nov. 21, 2007.

A. Castro, Y. Frauel, and B. Javidi, "Integral imaging with large depth of field using an asymmetric phase mask," Journal of Optics Express, vol. 15, Issue 16, pp. 10266-10273 (Aug. 2007).

European Search Report dated Apr. 28, 2016 from EP application 13847218.8.

Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.

S. Feiner, 2002, "Augmented reality: A new way of seeing," Scientific American, No. 54, 2002.

K. Ukai and P.A. Howardth, "Visual fatigue caused by viewing stereoscopic motion images: background, theories, and observations," Displays, 29(2), pp. 106-116, 2008.

B. T. Schowengerdt, M. Murari, E. J. Seibel, "Volumetric display using scanned fiber array," SID Symposium Digest of Technical Papers, 2010.

H. Hua and B. Javidi, "A 3D integral imaging optical see-through head-mounted display", Optics Express, 22(11): 13484-13491, 2014.

W. Song, Y. Wang. D. Cheng, Y. Liu, "Light field head-mounted display with correct focus cue using micro structure array," Chinese Optics Letters, 12(6): 060010, 2014.

T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.

Hu, X., Development of the Depth-Fused Multi-Focal Plane Display Technology, Ph.D. Dissertation, College of Optical Sciences, University of Arizona, 2014.

S. Ravikumar, K. Akeley, and M. S. Banks, "Creating effective focus cues in multi-plane 3D displays," Opt. Express 19, 20940-20952, 2011.

K. Hu and H. Hua, "Design and tolerance of a free-form optical system for an optical see-hrough multi-focal-plane display," Applied Optics, 54(33): 9990-9, 2015.

Hu and Hua, "Design and tolerance of a freeform optical system for an optical see-through multi-focal plane display," Applied Optics, 2015.

A. Yabe, "Representation of freeform surface suitable for optimization," Applied Optics, 2012.

Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).

* cited by examiner

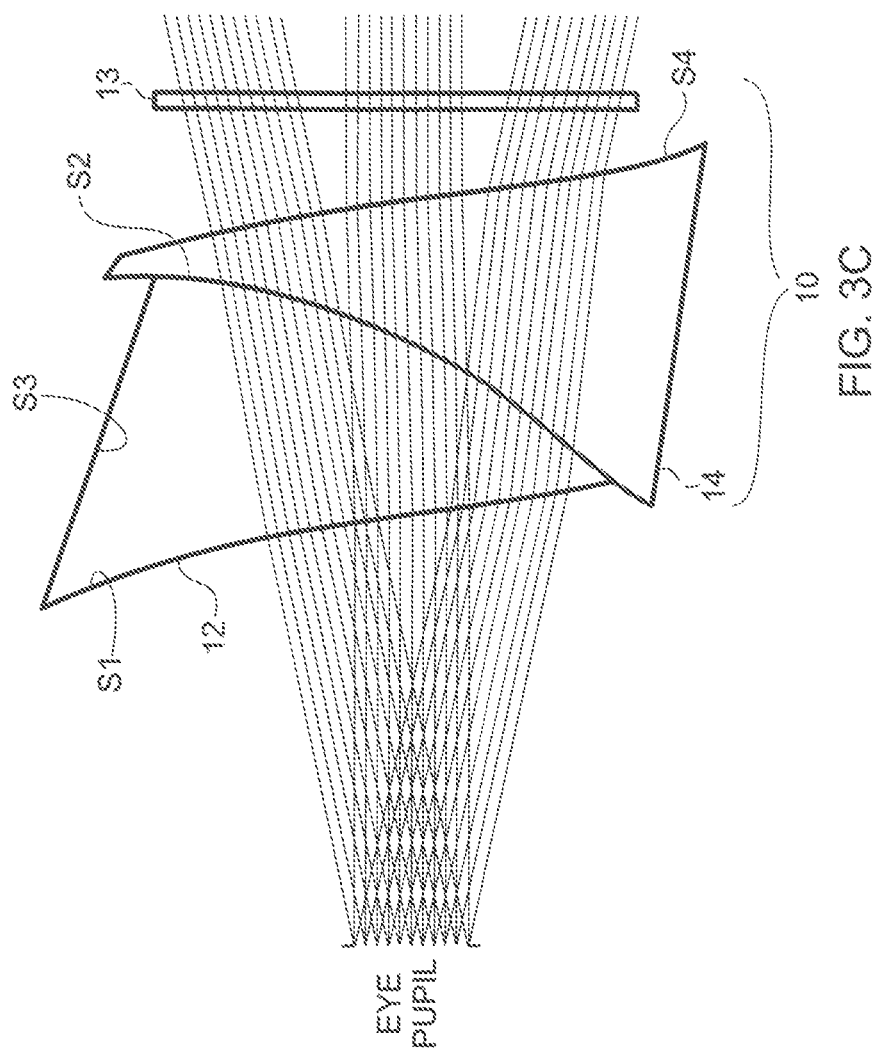

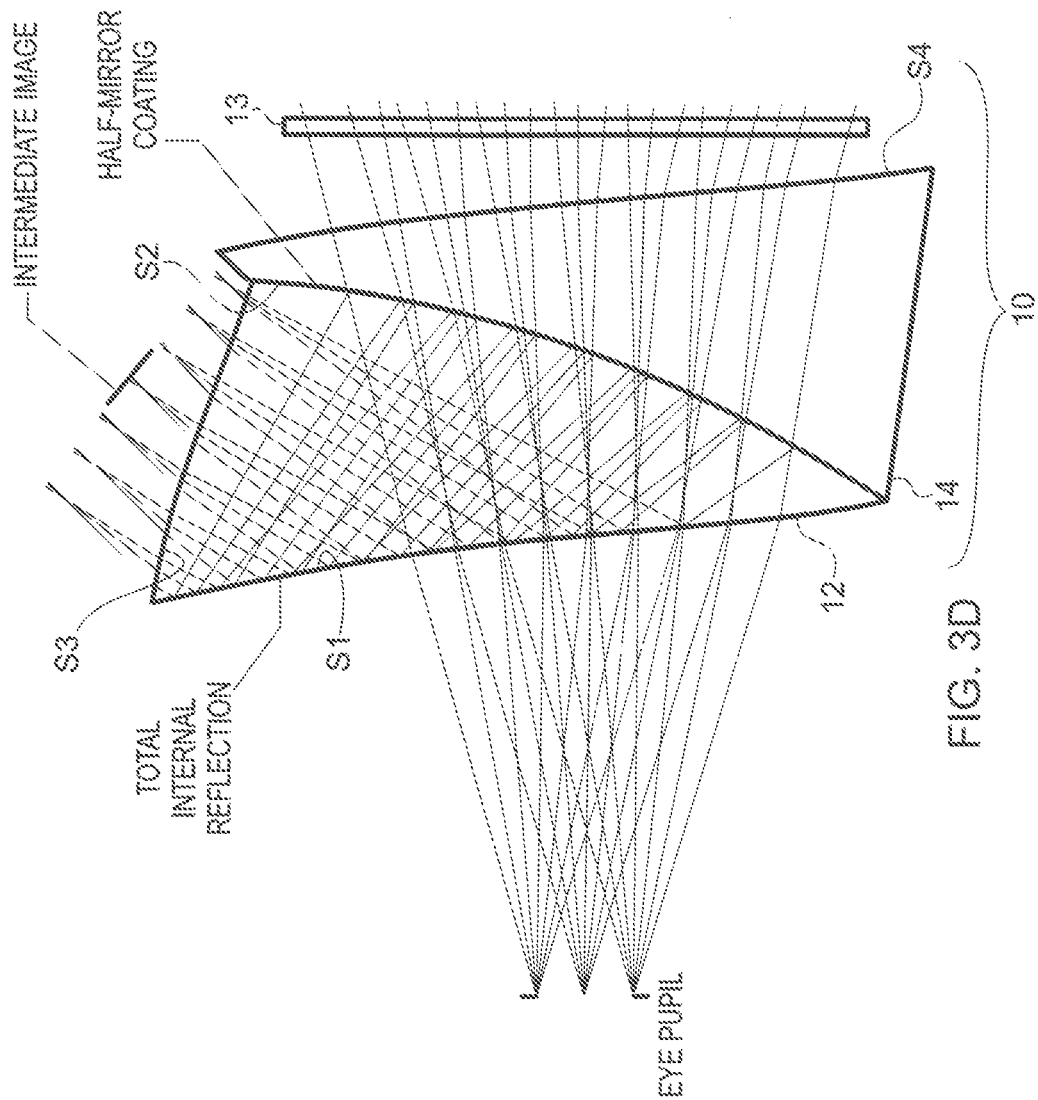

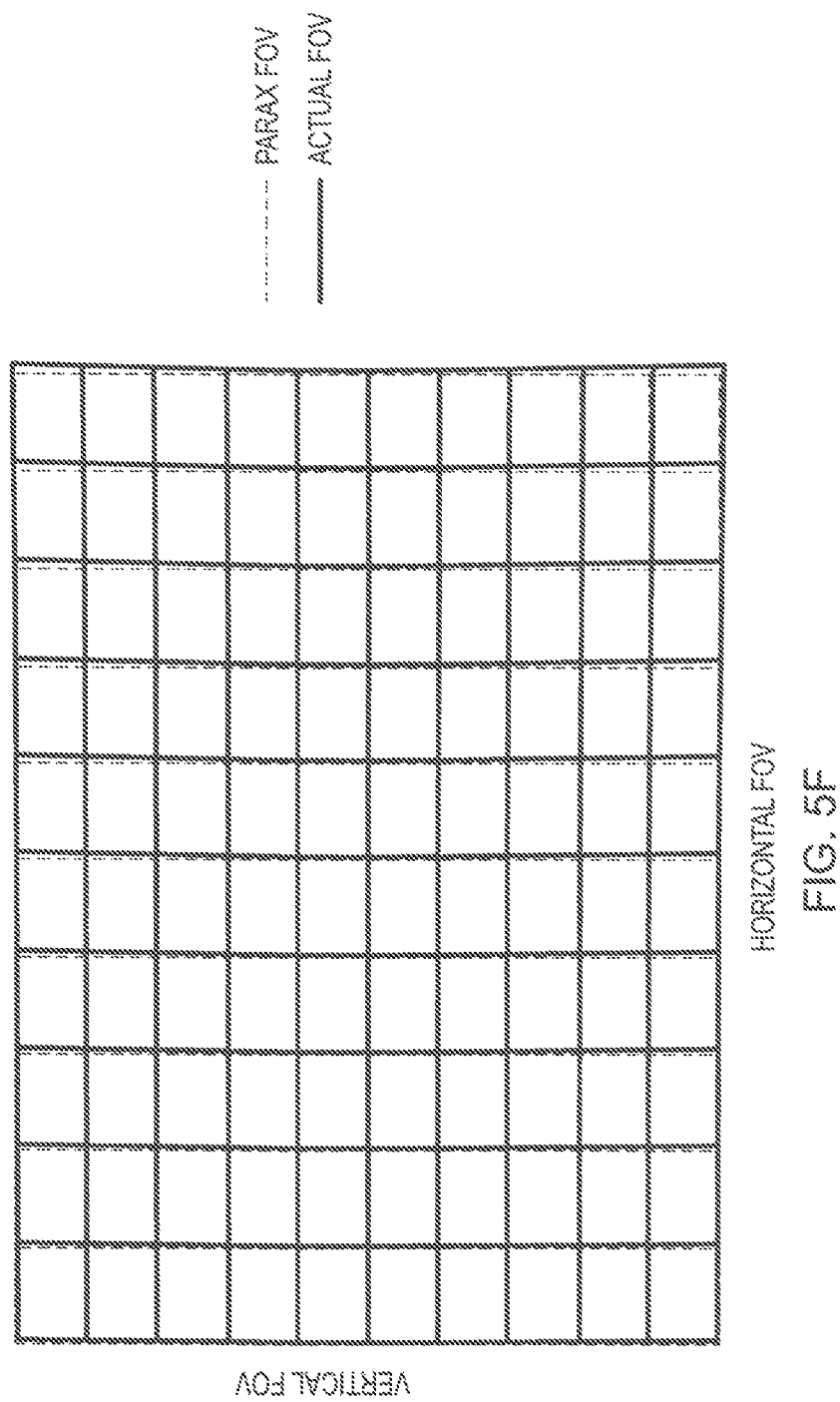

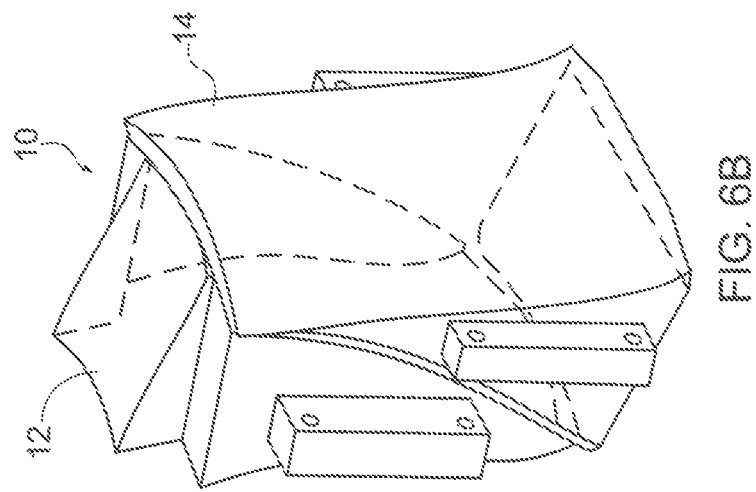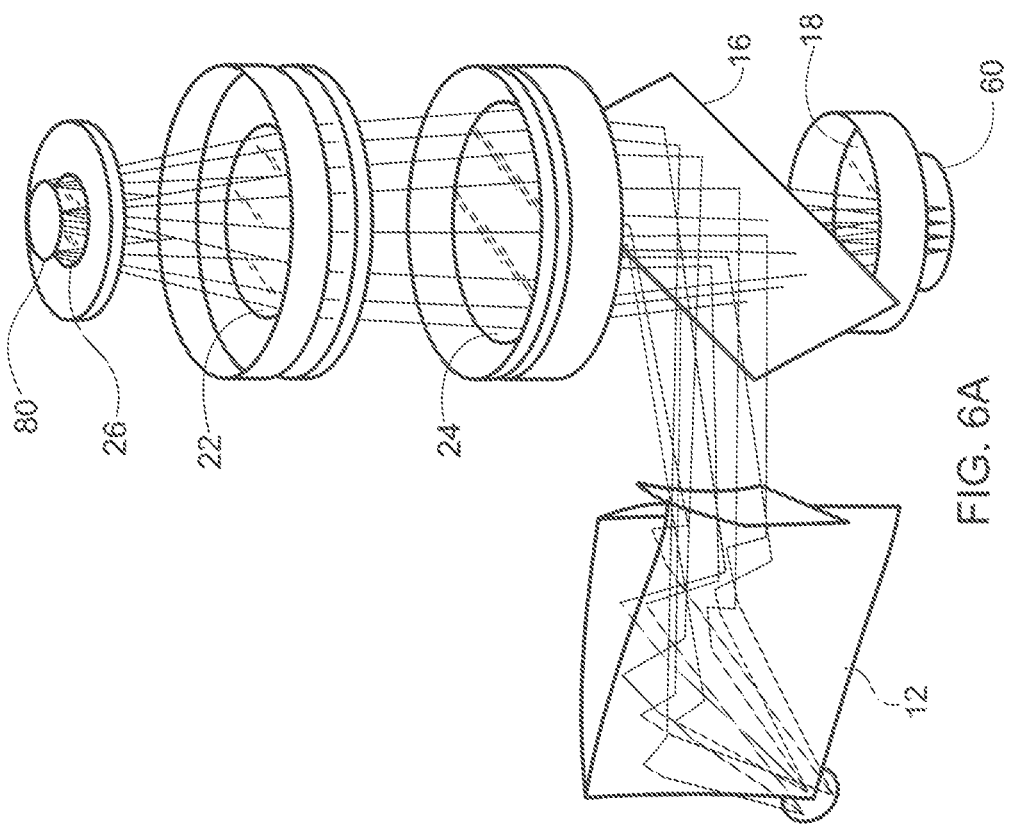

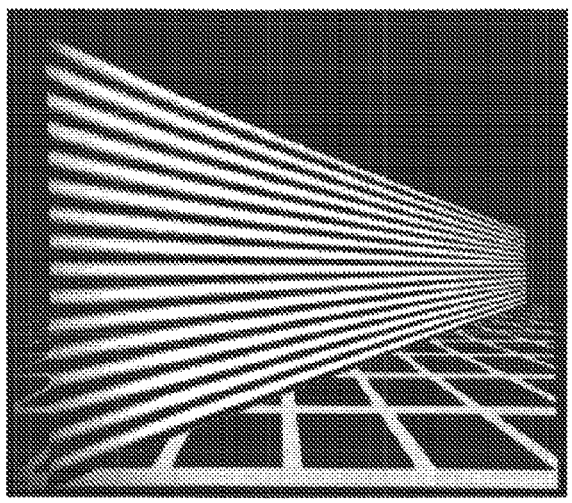
FIG. 7A
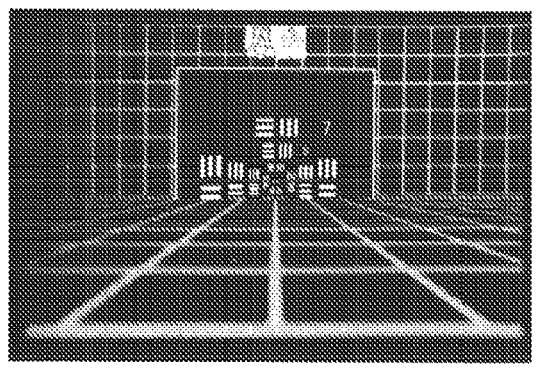 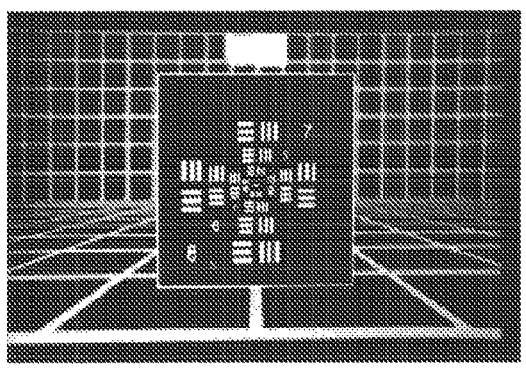
FIG. 7B              FIG. 7C

STEREOSCOPIC DISPLAYS WITH ADDRESSABLE FOCUS CUES

RELATED APPLICATIONS

This present application is a 371 application of International Application No. PCT/US2013/065422 filed Oct. 17, 2013, which claims the benefit of priority of U.S. Provisional Application No. 61/795,500, filed on Oct. 18, 2012, the entire contents of which application(s) are incorporated herein by reference.

GOVERNMENT LICENSE RIGHTS

This invention was made with government support under IIS0915035 awarded by NSF. The government has certain rights in the invention.

FIELD OF THE INVENTION

The present invention relates generally to stereoscopic displays, and more particularly, but not exclusively, to stereoscopic displays with addressable focus cues.

BACKGROUND OF THE INVENTION

Conventional stereoscopic 3D displays create the illusion of depth based on binocular disparities, rendering 3D scenes from a single pair of 2D perspective images at a fixed distance to the viewer. Therefore conventional stereoscopic displays force an unnatural decoupling of the accommodation and convergence cues, which may contribute to various visual artifacts in stereoscopic displays, such as distortion in perceived depth, diplopic vision, visual discomfort, and fatigue. Many approaches have been proposed which may overcome the drawbacks of conventional stereoscopic displays, including volumetric displays, holographic displays, and multi-focal-plane displays. However, a need exists to develop an optical see-through stereoscopic display which solves the fundamental accommodation-convergence problems and also renders large volumes of continuous 3D scene at high image quality and flickering-free speed.

A stereoscopic display with addressable focus cues is one of the most promising approaches to solving the fundamental accommodation-convergence problems of providing the capability of rendering correct or near-correct focus cues for virtual 3D objects. Unlike traditional stereoscopic displays, stereoscopic displays with addressable focus cues enable the ability to either dynamically vary the focal distance of the virtual display through an active optical element in accordance to the viewer's region of interest, known as vari-focal display mode, or present multiple focal planes at a flickering-free speed through with no need to track a viewer's region of interest, known as multi-focal display mode. For instance, multi-focal-plane displays present perspective 2D images at multiple carefully placed, discrete focal distances along the visual axis. These discrete focal planes sample a 3D scene volume into multiple zones, and objects within a zone are rendered by the corresponding pair of adjacent focal planes, as shown in FIG. 1. Therefore multi-focal-plane displays are able to render correct or near-correct focus cues for virtual objects at different depths. Contrary to multi-viewpoint displays such as holographic displays and volumetric displays, the multi-focal-plane display is a fixed-viewpoint display. By restricting the viewing position, multi-focal-plane display systems only need to display a small number of viewpoints. Also multi-focal-point displays can preserve disparity, occlusion and perspective in conventional 2D displays as well as rendering viewing-dependent lighting effects such as specular reflection and shading. In practice, the implementations of multi-focal-plane displays can be categorized into two categories: spatially multiplexed or temporally multiplexed. In a spatial-multiplexed system, multi-focal capability is achieved by stacking multiple 2D displays. In the alternative and more elegant, time-multiplexed system, the focal distances of images from a single 2D display are fast switched by an active optical element in synchronization with the frame rendering of multiple focal planes. In general, a multi-focal plane display can be readily adapted for use in a vari-focal mode without much change to the optics layout.

In addition, progress has recently been made in the field of stereoscopic displays that can be head-mounted and that have addressable focal planes for improved depth perception but require substantially less computational power than existing methods, as reflected in commonly owned U.S. Patent Application Publication. No. 2011/0075257, the contents of which are incorporated herein by reference. However, a need still exists for optical imaging systems which can provide enhanced imaging performance in stereoscopic displays with addressable focus cues.

SUMMARY OF THE INVENTION

In one of its aspects, the present invention may provide a virtual display system with addressable focus cues comprising a microdisplay for providing a virtual image for display to a user. A reflective active optical element, configured to provide a variable optical power, may also be provided. A relay lens may be disposed along an optical path between the microdisplay and the active optical element, with the relay lens positioned therebetween such that the microdisplay and active optical element are disposed at conjugate planes of the relay lens. A beamsplitter may be disposed along the optical path between the microdisplay and the active optical element at an orientation to receive optical radiation from the active optical element. In addition, a see-through eyepiece may be provided which includes a selected surface configured to receive optical radiation from the beamsplitter and reflect the received radiation to an exit pupil of the system to provide a virtual display path. The selected surface may also be configured to receive optical radiation from a source other than the microdisplay (such as the real world) and to transmit such optical radiation to the exit pupil to provide a see-through optical path. The eyepiece may include a freeform prism shape, and, in particular, may include a first surface configured to receive and refract optical radiation from the beamsplitter and may include a second surface configured to receive the refracted optical radiation from the first surface, with the second surface configured to reflect the optical radiation to the selected surface of the eyepiece. The second surface may be configured to total internally reflect the optical radiation, and one or more of the surfaces of the eyepiece may comprise a rotationally asymmetric surface.

In another of its aspects, the present invention may provide a virtual display system with addressable focus cues comprising a microdisplay for providing a virtual image for display to a user, and an eyepiece comprising a reflective optical element configured to reflect optical radiation from the microdisplay to an exit pupil of the system. A relay lens, comprising a refractive active optical element configured to provide a variable optical power, may be disposed along an optical path between the microdisplay and the eyepiece to relay an image from the microdisplay to the eyepiece. The relay lens may include first and second lens groups disposed along the optical path with the active optical element located between the first and second lens groups. In addition, a beamsplitter may be disposed along the optical path between the microdisplay and the eyepiece, with the beamsplitter configured to receive and transmit optical radiation from a source other than the microdisplay (such as the real world) to the exit pupil to provide a see-through optical path. The eyepiece may comprise a spherical mirror, and the system may be telecentric in the microdisplay. The system may also have an f-number less than 3.

BRIEF DESCRIPTION OF THE DRAWINGS

The foregoing summary and the following detailed description of exemplary embodiments of the present invention may be further understood when read in conjunction with the appended drawings, in which:

FIG. 3C schematically illustrates the free-form eyepiece and compensator of FIGS. 3A-3B showing the see-through optical path;

FIG. 3D schematically illustrates the free-form eyepiece and compensator of FIGS. 3A-3B showing both the see-through and display paths;

FIG. 5F illustrates a distortion grid through the see-through path for the virtual display system of FIG. 3B;

FIG. 6A schematically illustrates a 3D layout of the free-form eyepiece with relay optics of the display system of FIG. 3B;

FIG. 6B schematically illustrates a 3D Solidworks model of the assembled free-form eyepiece and compensator of the display system of FIG. 6A;

FIG. 7A illustrates a depth-fused 6-focal-plane 3D scene of 40 degrees of field of view and 3 diopters of depth, captured through the eyepiece for a prototype built according to the design of FIG. 3B;

FIGS. 7B-7C illustrate 6-focal-plane 3D scenes captured by a camera focused at 2 m and 30 cm, respectively, for a prototype built according to the design of FIG. 3B;

DETAILED DESCRIPTION OF THE INVENTION

Figure 1:
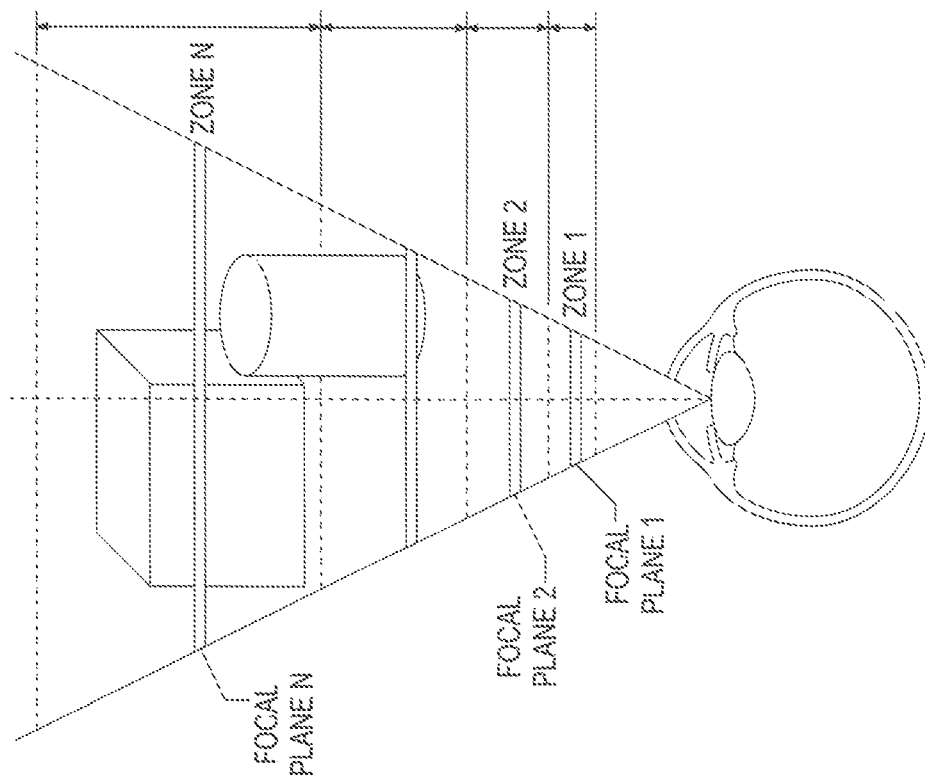
FIG. 1 schematically illustrates 3D objects rendered by multiple focal planes relative to a viewer.
Figure 2:
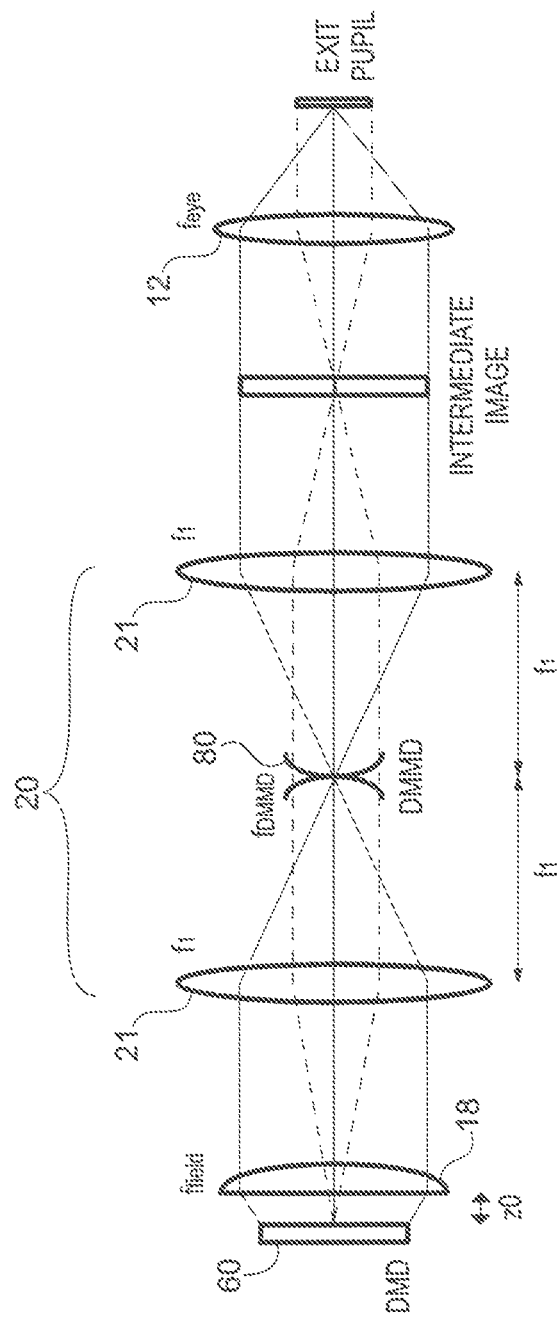
FIG. 2 schematically illustrates the unfolded optical path of an exemplary display system in accordance with the present invention.
Figure 3A:
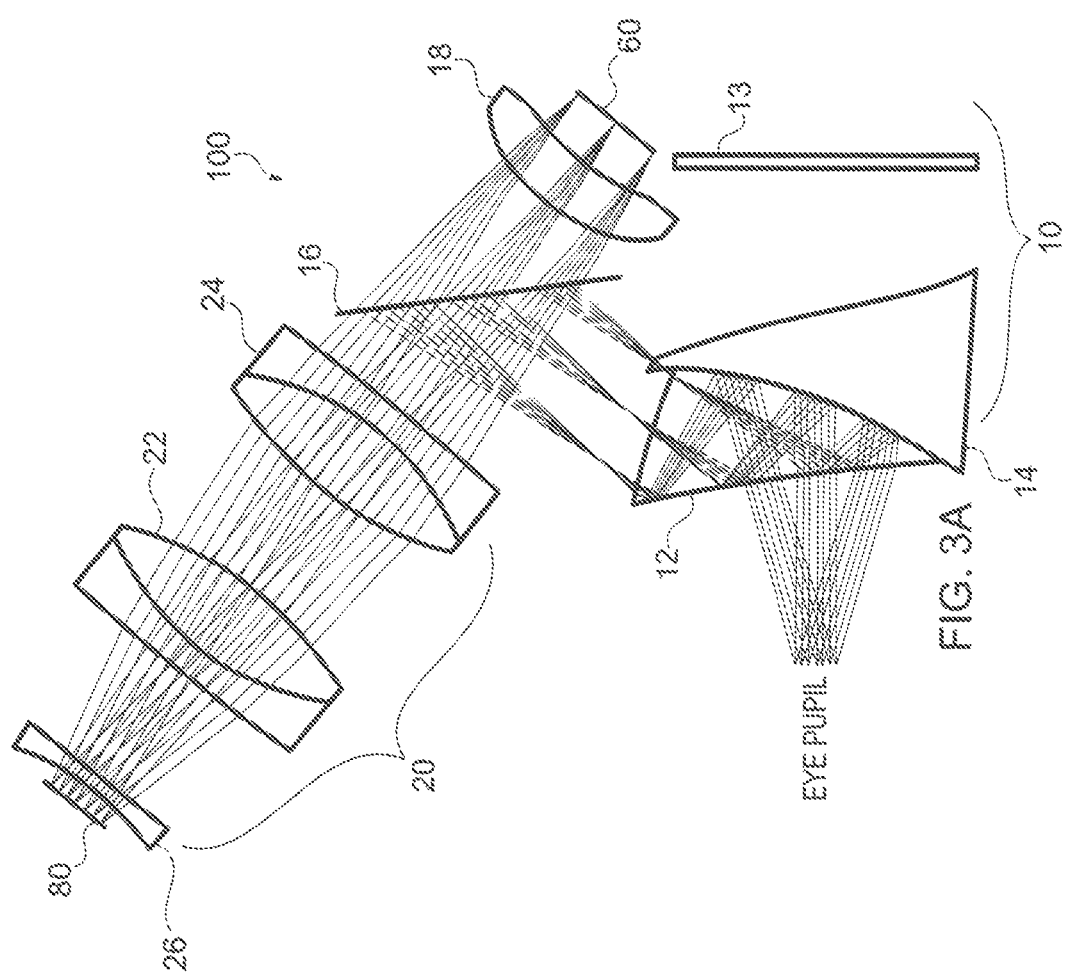
FIG. 3A schematically illustrates a 2D layout of virtual display optics of an exemplary display system in accordance with the present invention.
Figure 3B:
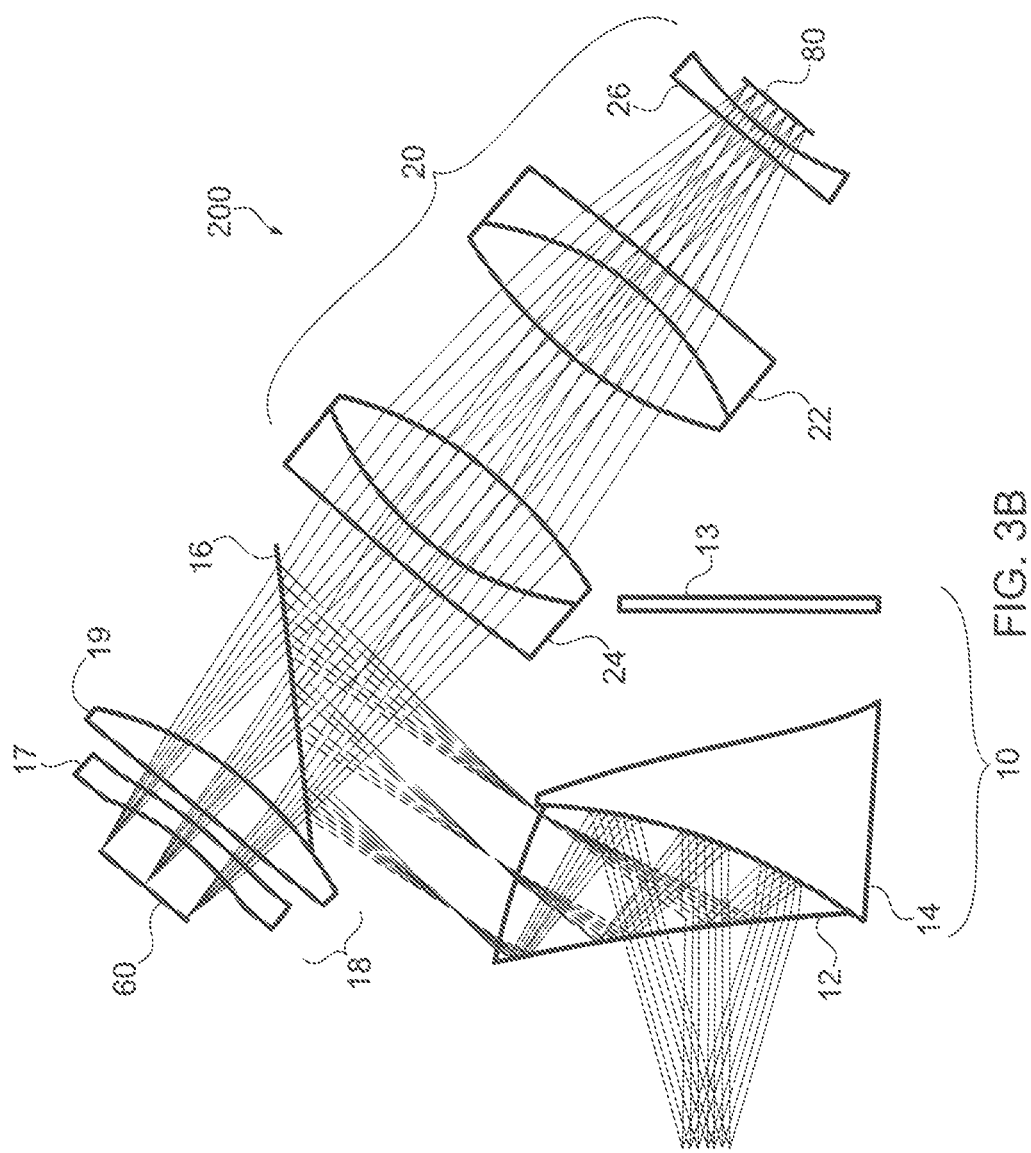
FIG. 3B schematically illustrates a 2D layout of the exemplary display system of FIG. 3A but having a field lens comprising two optical elements rather than a singlet.

Referring now to the figures, wherein like elements are numbered alike throughout, in accordance with one aspect of the present invention, FIG. 2 schematically illustrates the first-order unfolded optical path of an exemplary optical system which is particularly suited for providing high imaging quality in depth-fused multi-focal-plane stereoscopic displays with addressable focus cues. FIGS. 3A, 3B schematically illustrate particular designs according to the layout of FIG. 2, with a first optical system 100 having a single field lens 18, FIG. 3A, and an alternative system 200 having a two-element 17, 19 field lens 18, FIG. 3B. (While a single set of optics for a single viewer's eye is illustrated, it is understood that in a final stereoscopic device, two such sets of optics will be provided, one for each eye.)

A relevant feature of the designs is the inclusion of a relay lens group 20 which relays the image from a microdisplay, such as a digital micro-mirror device (DMD) 60, to the front of an eyepiece 12. The relay lens group 20 may include a traditional, non-deformable lens 21 and a reflective active optical element, such as a deformable membrane mirror 80, FIG. 2. The relay lens 21 may include a pair of doublets 22, 24 and lens 26, FIGS. 3A, 3B. The deformable membrane mirror device (DMMD) 80 may be placed at the focal plane of the relay lens 21 and may serve as the system stop. Together the lens 21, FIG. 2, (or lenses 22, 24, 26, FIGS. 3A, 3B) and the DMMD 80 may provide a folded double-telecentric system particularly suited to depth-fused multi-focal-plane stereoscopic displays. An advantage of designing a double-telecentric relay 20 is that the change of optical power on the DMMD 80 changes only the location of the intermediate image without changing the image magnification, so that the field of view of the system and the angular resolution in eye space remain constant, and so that the corresponding pixels on multiple focal planes overlap with each other one-to-one. Thus, the designs of FIGS. 3A, 3B are well suited for a depth fusing technique without the need for correcting misaligned multiple focal images otherwise resulting from different image magnifications. These benefits may be further understood by analysis of the focus cue and accommodation range.

The focus cue or accommodation range, $\Delta D_{accommodation}$, which implies the depth range of the 3D volume the system can render, is determined by $$\Delta D_{accommodation} = \frac{\Phi_{eye}^2}{\Phi_1^2} \times \Delta \Phi_{DMMD},$$

where $\Phi_{eye}$ is the power of the eyepiece 12, $\Phi_1$ is the power of the relay lens 21, and $\Delta\Phi_{DMMD}$ denotes the range of power by which the deformable mirror 80 can change. The above equation gives and the relationship between the focal length of the relay lens 20 and the eyepiece 12. Since the eyepiece 12 will relay the system stop, i.e., the DMMD 80, to form an exit pupil, the ratio between the size of the exit pupil $D_{xp}$ and the size of the DMMD 80, is fixed once the desired accommodation range is determined:

$$D_{XP} = \frac{D_{DMMD}}{f_1 / f_{eye}}.$$

One drawback of the folded double-telecentric relay design is that it provides no magnification to the image of the DMD display 60. Therefore to get a desired system field of view, a field lens 18 may be added in front of the DMD display 60 to magnify the image. (The display 60 may be an emissive display, or maybe a reflective display that is illuminated through an illumination path.) The magnification introduced by the field lens 18 is $$m = \frac{1}{\frac{z_0}{f_{field}} - 1}.$$

The system half field of view is then:

$$HFOV = \frac{y'_{DMD}}{f_{eye}} = \frac{y_{DMD} \times m}{f_{eye}}.$$

Based on the design goal, device specifications, and mechanical considerations, Table 1 lists the first-order system specifications for the designs of FIGS. 3A, 3B.

TABLE 1

First-order system specifications for virtual display.

| | |
|---|---|
| Microdisplay | 0.7" DMD, XGA resolution, 14 μm pixel |
| Deformable mirror defocus range | 0~1.2 diopters |
| Accommodation Range | 0~3 diopters |
| Field of view | 40° (32.5° H × 24.5° V) |
| Relay lens focal length, $f_1$ | 43.9 mm |
| Eyepiece focal length, $f_{eye}$ | 27.8 mm |
| Exit pupil diameter | 6 mm |

Free Form Eyepiece and Compensator

The optical see-through capabilities of the systems 100, 200 may be realized by using beamsplitters to fold the virtual display optics (e.g., DMD 60, field lens 18, relay lens group 20) out of the way. However, given that the eyepiece 12 in the present design has a short focal length, it was very difficult to design the system conventionally.

In the instant exemplary design, a more elegant solution was pursued. As shown in FIGS. 3C, 3D, the eyepiece 12 was designed as a wedge-shaped free-form plastic lens. The free-form prism eyepiece 12 may include three rotationally asymmetric surfaces, labeled as S1, S2, and S3, respectively. Considering the virtual display path, FIG. 3D, a ray from the intermediate image of the display 60 is first refracted by the surface S3. After two consecutive reflections by surfaces S1 and S2, the ray is transmitted through the surface S1 and reaches the exit (eye) pupil of the system. The surface S1 desirably satisfies the condition of total internal reflection for all rays reflected on the surface S1. The surface S2 of the eyepiece 12 may be coated as a half mirror in order to facilitate the optical see-through capability. A free-form compensator 14, which may include two rotationally asymmetric surfaces, S2 and S4, may be cemented to the eyepiece 12 to compensate for the aberrations and distortions introduced to the rays from the real-world scene when the two pieces 12, 14 are combined together, FIG. 3C. In addition, an optional cylindrical lens 13 may be included with the free-form compensator 14 to help minimize aberrations and distortion for the see-through path.

To achieve the desired optical performance, MTF values were selected to evaluate the overall image sharpness. Since the virtual display system 100 was designed backwards from the eyepiece 12 to the display 60, the goal was to have MTF values no less than 20% at spatial frequency of 36 lp/mm on the display 60, which is the cut-off frequency for pixel size of 14 μm. The human eye has an angular resolution of 1 arcmin. Therefore the compensator 14 was optimized such that the MTF values at 30 cycles/degree are greater than 0.2 to minimize degradation of the real-world scene. Another important optical performance factor of the system 100, 200 was image distortion. In conventional system, distortion is regular and can be compensated easily electronically or computationally. However in systems with off-axis freeform optics, the distortion can be very large and irregular. Therefore the design of the systems 100, 200 should have tight constraints on distortion sampled over the entire FOV. The distortion is especially important for the see-through optical path, because it can change the sizes and shapes of objects seen through the see-through view, thus greatly affecting 3D perception.

Design and Optimization Procedures

The design of the systems 100, 200 involved two steps, the virtual display path and the optical see-through path. For the virtual display path, the freeform eyepiece 12 was setup with the relay lens 20 and field lens 18 in CodeV and optimized together. The display performance was balanced for fields sampled across the 40-degrees of FOV and across the desired accommodation range of 3 diopters. After the virtual display optimization was finished, the freeform eyepiece 12 was setup alone with the compensator 14 and the compensator's back surface S4 was optimized for see-through performance. The see-through performance was optimized for 60 degrees of field of view while emphasizing the central 40 degrees. A progressive optimization strategy was adopted in both steps by gradually increasing the number of variable surface coefficients of the freeform surfaces as the system performance improved.

In the final design, the freeform eyepiece and compensator surfaces S1, S2, S3, S4 were described by XY-polynomials to the $10^{th}$ order and prototyped by single-point diamond turning on PMMA. In the system 200 of FIG. 3B, one of the field lenses elements, element 17, was optimized, and a diffractive optical feature was added to correct for chromatic aberrations introduced by the freeform eyepiece 12. All other lenses 19, 22, 24, 26 are all off-the-shelf components to reduce the prototyping costs.

Figure 4A:
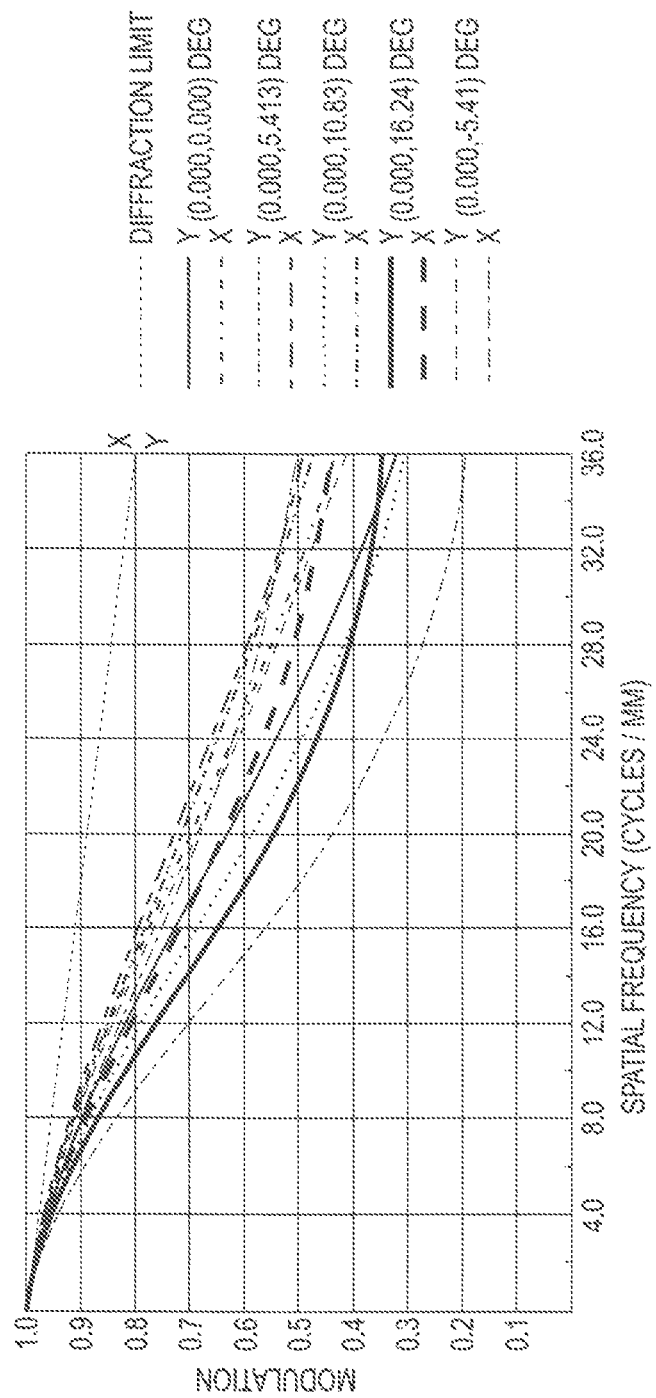
FIGS. 4A-4E illustrate the polychromatic MTF through the display path for the virtual display system of FIG. 3B.
Figure 4B:
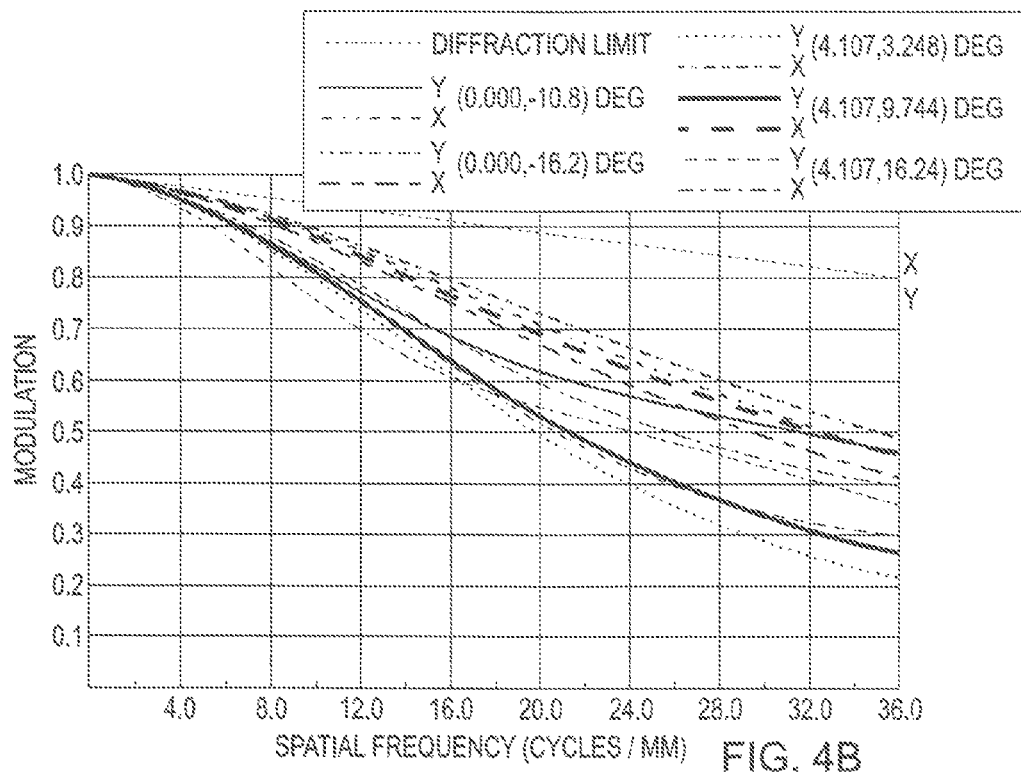
Figure 4C:
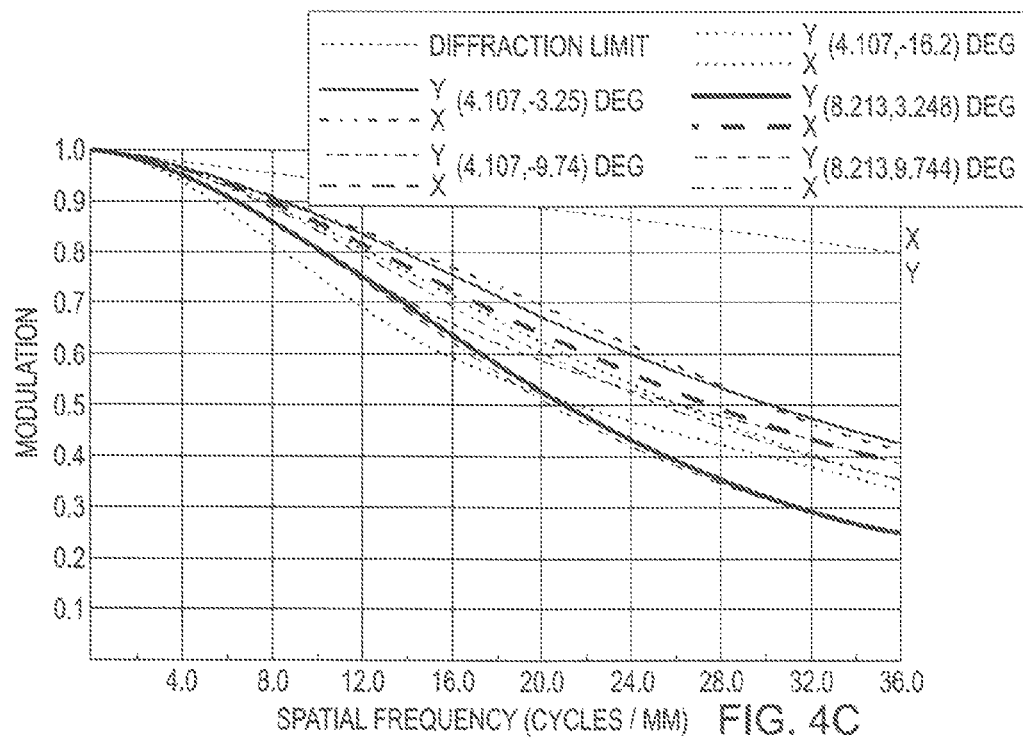
Figure 4D:
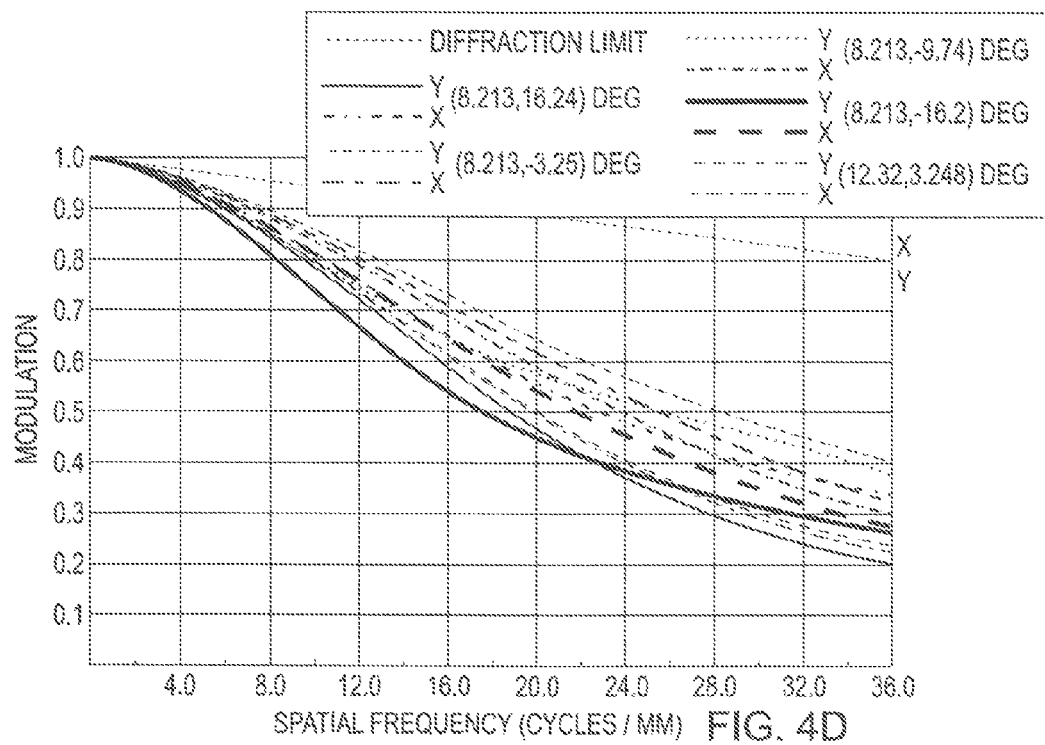
Figure 4E:
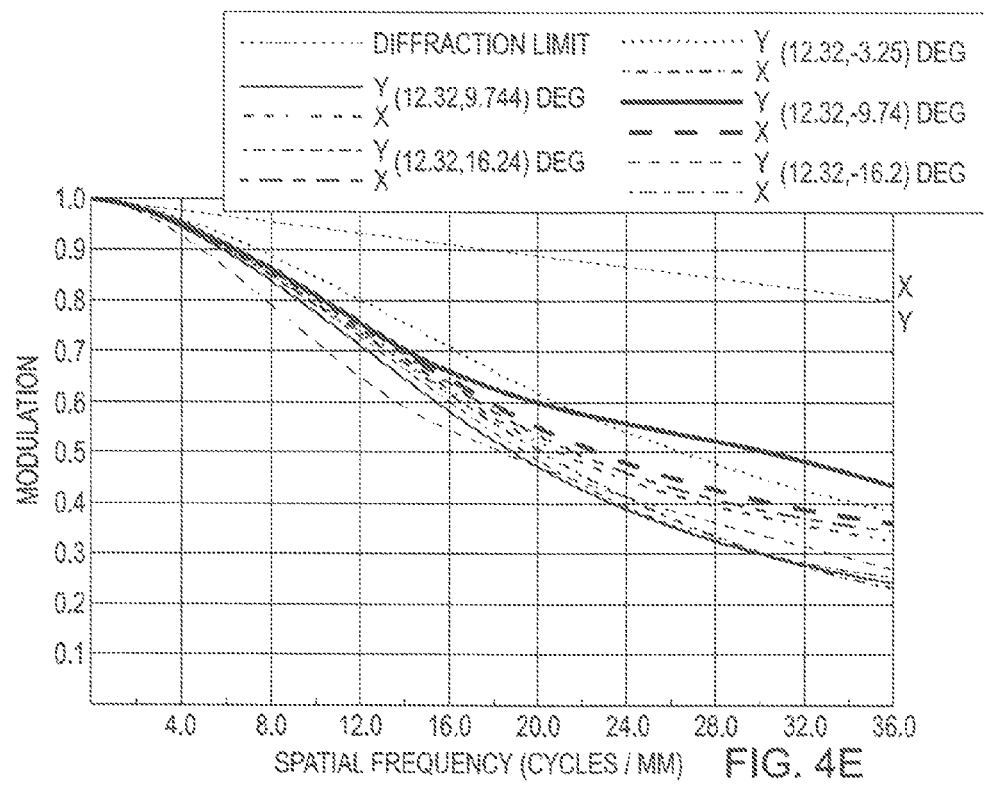
Figure 4F:
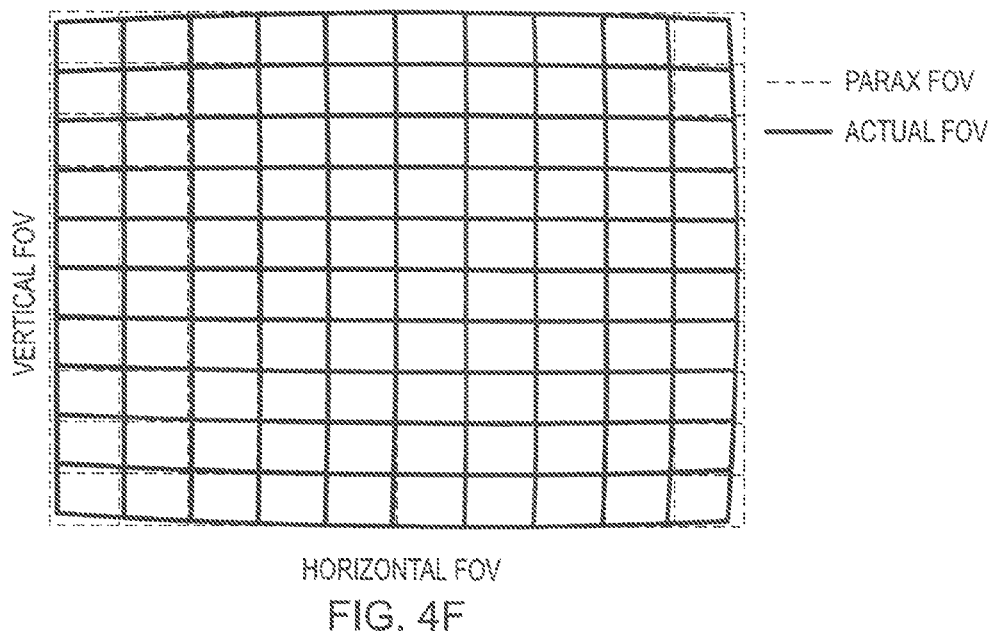
FIG. 4F illustrates a distortion grid through the display path for the virtual display system of FIG. 3B.
Figure 5A:
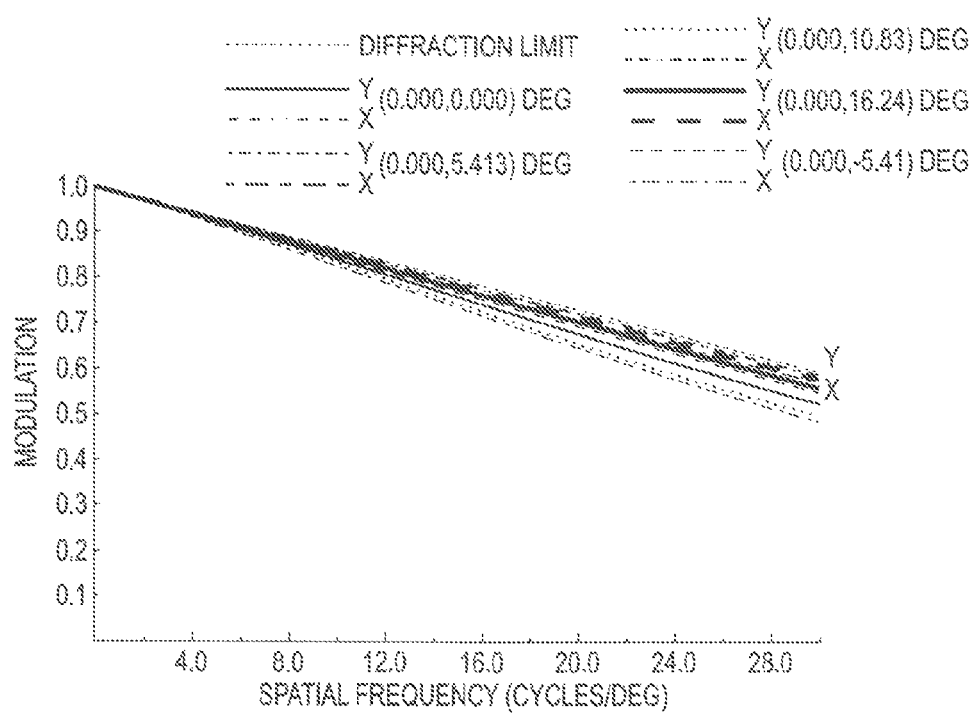
FIGS. 5A-5E illustrate the polychromatic MTF through the see-through path for the virtual display system of FIG. 3B.
Figure 5B:
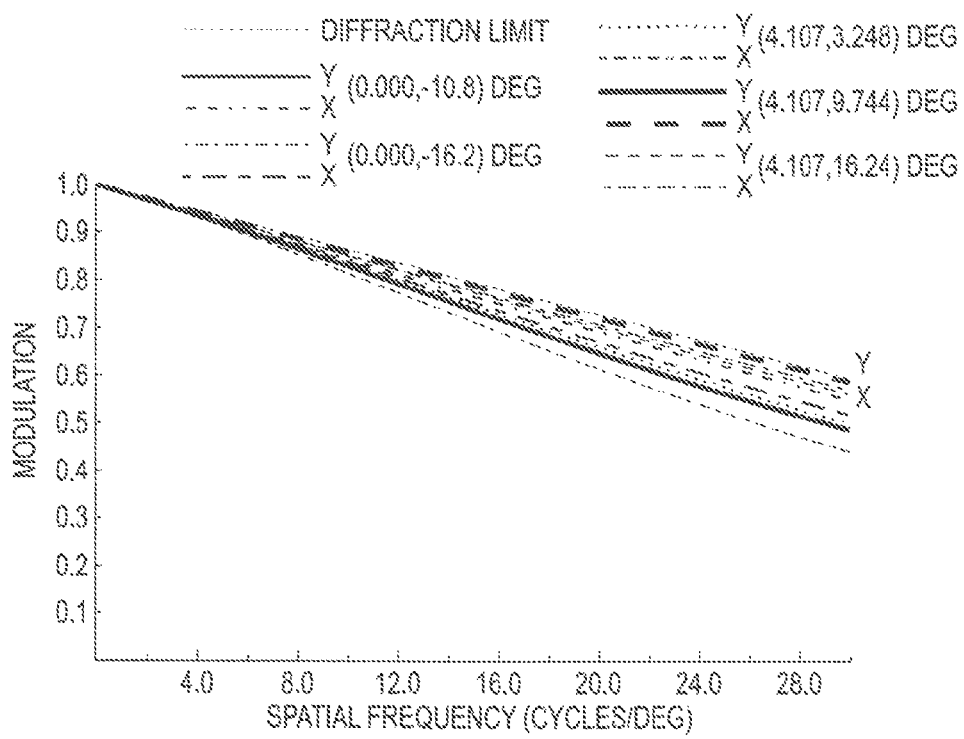
Figure 5C:
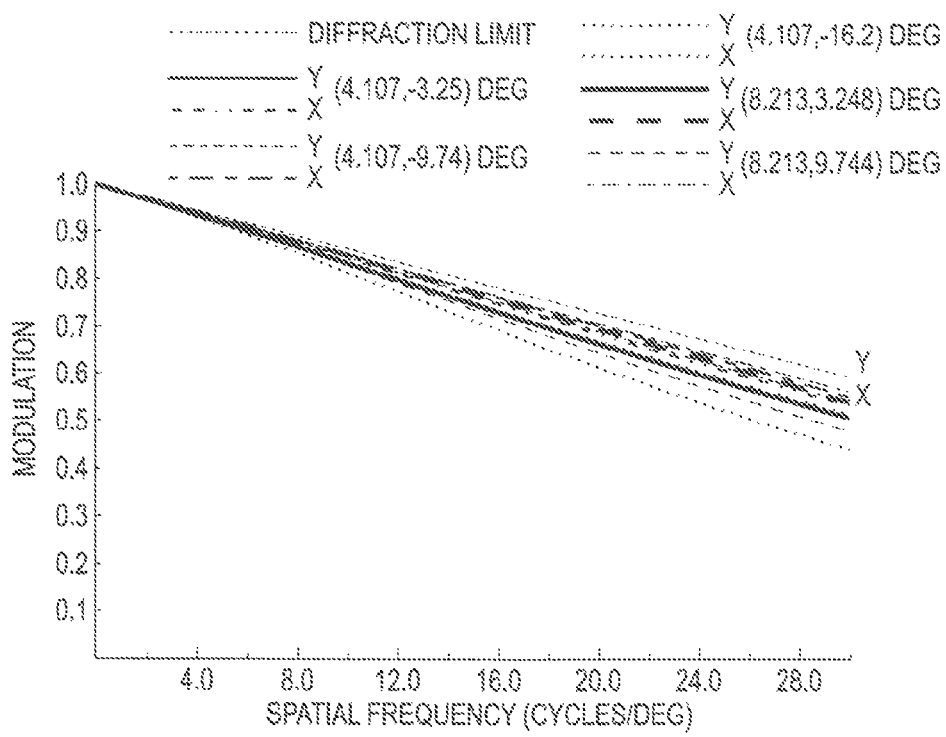
Figure 5D:
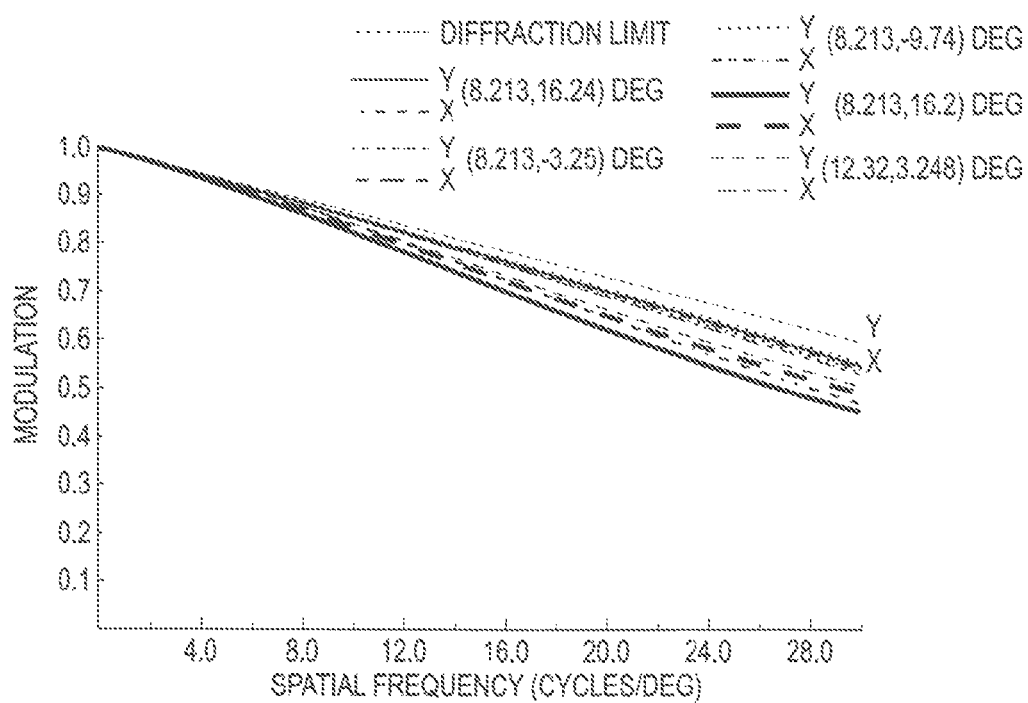
Figure 5E:
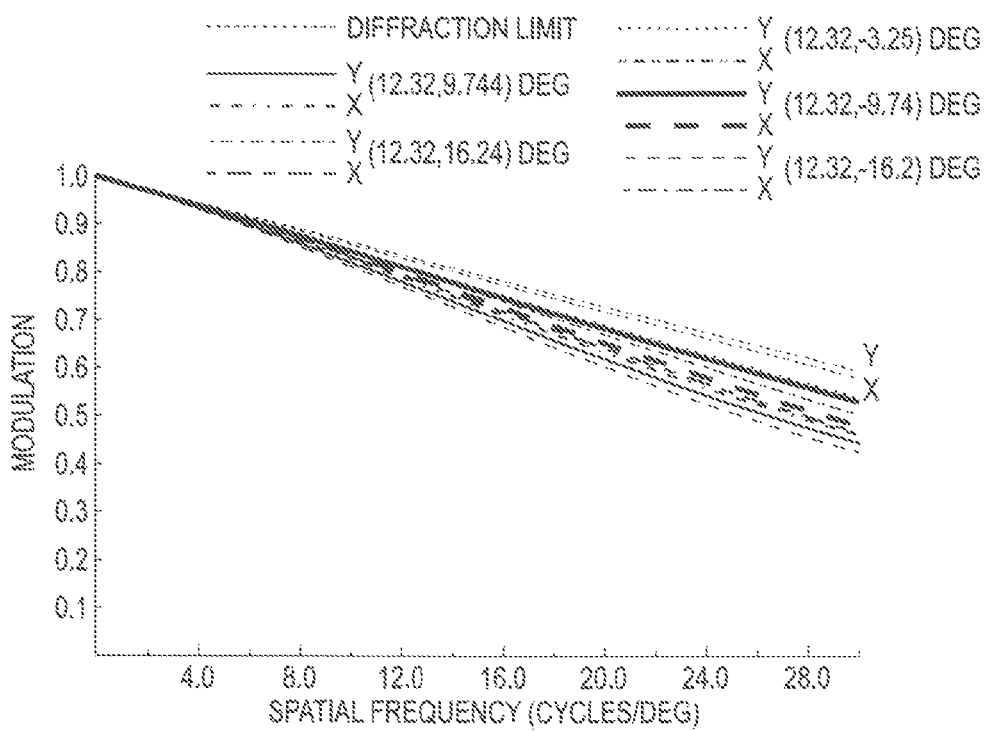

The polychromatic MTF values of the virtual display, evaluated for a 3 mm pupil, are greater than 0.2 at 36 lp/mm across the 40 degrees of field of view with a central field value of 0.5, FIGS. 4A-4E. The virtual display also shows minimal distortion, FIG. 4F. The polychromatic MTF values of the see-through optical path, evaluated for 3 mm pupil, are greater than 0.4 at 30 cycles/degree across the 40 degrees of field of view, FIGS. 5A-5E. The distortion of the see-through scene was also very well corrected, FIG. 5F. The prescription for the particular design of FIG. 3B is provided as follows.

System Prescription for Virtual Display Path

In Table 2, surfaces #2-#4 specify the free-form eyepiece 12. Surface #2 and #4 represent the same physical surface and is also denoted as eyepiece surface S1. Surface #3 is also denoted as eyepiece surface S2, and Surface #5 is also denoted as eyepiece surface S3. Surfaces #8-#15 and surfaces #17-#24 are the same group of relay lenses 22, 24, 26 modeled in double path. The deformable mirror 80 is modeled at Surface #16. Surfaces #25-#26 model the beam splitter 16 at 45 degrees. Surfaces #27-#28 represent the field lens element 17, and Surfaces #29-#30 represent the field lens element 19.

TABLE 2

System prescription for virtual display path.

| Element number used in figures | Surface No. | Surface Type | Y Radius | Thickness | Material | Refract Mode |
|---|---|---|---|---|---|---|
|  | 1 (Stop) | Sphere | Infinity | 0.000 |  | Refract |
| 12, S1 | 2 | XY Poly | −185.496 | 0.000 | PMMA | Refract |
| 12, S2 | 3 | XY Poly | −67.446 | 0.000 | PMMA | Reflect |
| 12, S1 | 4 | XY Poly | −185.496 | 0.000 | PMMA | Reflect |
| 12, S3 | 5 | XY Poly | −830.046 | 0.000 |  | Refract |
|  | 6 | Sphere | Infinity | 0.000 |  | Refract |
|  | 7 | Sphere | Infinity | 53.933 |  | Refract |
| 24 | 8 | Sphere | 435.850 | 4.000 | NSF10 | Refract |
|  | 9 | Sphere | 36.730 | 12.070 | NBAF10 | Refract |
|  | 10 | Sphere | −53.760 | 18.079 |  | Refract |
| 22 | 11 | Sphere | 53.760 | 12.070 | NBAF10 | Refract |
|  | 12 | Sphere | −36.730 | 4.000 | NSF10 | Refract |
|  | 13 | Sphere | −435.850 | 19.826 |  | Refract |
| 26 | 14 | Sphere | Infinity | 2.000 | NBK7 | Refract |
|  | 15 | Sphere | 38.900 | 3.502 |  | Refract |
| 80 | 16 | Sphere | −4000.000 | −3.502 |  | Reflect |
| 26 | 17 | Sphere | 38.900 | −2.000 | NBK7 | Refract |
|  | 18 | Sphere | Infinity | −19.826 |  | Refract |
| 22 | 19 | Sphere | −435.850 | −4.000 | NSF10 | Refract |
|  | 20 | Sphere | −36.730 | −12.070 | NBAF10 | Refract |
|  | 21 | Sphere | 53.760 | −18.079 |  | Refract |
| 24 | 22 | Sphere | −53.760 | −12.070 | NBAF10 | Refract |
|  | 23 | Sphere | 36.730 | −4.000 | NSF10 | Refract |
|  | 24 | Sphere | 435.850 | −23.000 |  | Refract |
| 16 | 25 | Sphere | Infinity | −1.600 | 471400.6541 | Refract |
|  | 26 | Sphere | Infinity | −10.513 |  | Refract |
| 19 | 27 | Sphere | −46.700 | −6.500 | NBK7 | Refract |
|  | 28 | Sphere | Infinity | −1.896 |  | Refract |
| 17 | 29 | Asphere | −102.223 | −2.800 | PMMA | Refract |
|  | 30 | Asphere | −61.641 | −7.655 |  | Refract |

System Prescription for Optical See-Through Path

In Table 3 surfaces #2 and #3 are eyepiece surfaces S1 and S3, modeled the same as in the virtual display path. Surfaces #4, #5 specify the free-form compensator 14. Surface #4 is, it an exact replica of Surface #3 (eyepiece surface S3).

TABLE 3

System prescription for see-through path.

| Element number used in figures | Surface No. | Surface Type | Y Radius | X Radius | Thickness | Material | Refract Mode |
|---|---|---|---|---|---|---|---|
|  | 1 (Stop) | Sphere | Infinity | Infinity | 0.000 |  | Refract |
| 12, S1 | 2 | XY Poly | −185.496 | −185.496 | 0.000 | PMMA | Refract |
| 12, S3 | 3 | XY Poly | −67.446 | −67.446 | 0.000 | PMMA | Refract |
| 14, S2 | 4 | XY Poly | −67.446 | −67.446 | 0.000 | PMMA | Refract |
| 14, S4 | 5 | XY Poly | −87.790 | −87.790 | 10.000 |  | Refract |
| 13 | 6 | Cylindrical | Infinity | −103.400 | 6.5 | NBK7 | Refract |
| 13 | 7 | Sphere | Infinity | Infinity | 0.000 |  | Refract |

As used in the system prescription Tables, e.g., Table 2 or Table 3, the term "XY Poly" refers to a surface which may be represented by the equation $$z = \frac{cr^2}{1 + \sqrt{1-(1+k)c^2r^2}} + \sum_{j=2}^{66} C_j x^m y^n$$

$$j = \frac{(m+n)^2 + m + 3n}{2} + 1,$$

where z is the sag of the free-form surface measured along the z-axis of a local x, y, z coordinate system, c is the vertex curvature (CUY), r is the radial distance, k is the conic constant, and $C_j$ is the coefficient for $x^m y^n$. The term "Asphere" in the Tables refers to an aspherical surface which may be represented by the equation $$z = \frac{cr^2}{1 + \sqrt{1-(1+k)c^2r^2}} + Ar^4 + Br^6 + Cr^8 + Dr^{10} + Er^{12},$$

where z is the sag of the surface measured along the z-axis of a local x, y, z coordinate system, c is the vertex curvature, r is the radial distance, k is the conic constant, A through E are the 4th, 6th, 8th, 10th and 12th order deformation coefficients, respectively.

TABLE 4

Optical surface prescription of Surface #2 and #4 of Table 2.

| Y Radius | −1.854965E+02 | X**2 * Y**5 | −1.505674E−10 |
|---|---|---|---|
| Conic Constant | −2.497467E+01 | X * Y**6 | 0.000000E+00 |
| X | 0.000000E+00 | Y**7 | −4.419392E−11 |
| Y | 0.000000E+00 | X**8 | 4.236650E−10 |
| X2 | −2.331157E−03 | X7 * Y | 0.000000E+00 |
| X * Y | 0.000000E+00 | X**6 * Y**2 | −1.079269E−10 |
| Y2 | 6.691726E−04 | X5 * Y**3 | 0.000000E+00 |
| X3 | 0.000000E+00 | X4 * Y**4 | −1.678245E−10 |
| X**2 * Y | −1.066279E−04 | X**3 * Y**5 | 0.000000E+00 |
| X Y2 | 0.000000E+00 | X2 * Y**6 | 2.198604E−12 |
| Y**3 | −2.956368E−05 | X * Y**7 | 0.000000E+00 |
| X4 | −1.554280E−06 | Y8 | −2.415118E−12 |
| X**3 * Y | 0.000000E+00 | X**9 | 0.000000E+00 |
| X**2 * Y2 | 1.107189E−06 | X8 * Y | 4.113054E−12 |
| X * Y3 | 0.000000E+00 | X7 * Y**2 | 0.000000E+00 |
| Y4 | 1.579876E−07 | X6 * Y**3 | −1.805964E−12 |
| X5 | 0.000000E+00 | X5 * Y**4 | 0.000000E+00 |
| X**4 * Y | 1.789364E−07 | X**4 * Y**5 | 9.480632E−13 |
| X**3 * Y2 | 0.000000E+00 | X3 * Y**6 | 0.000000E+00 |
| X**2 * Y3 | −2.609879E−07 | X2 * Y**7 | 2.891726E−13 |

TABLE 4-continued

Optical surface prescription of Surface #2 and #4 of Table 2.

| | | | |
|---|---|---|---|
| X * Y**4 | 0.000000E+00 | X * Y**8 | 0.000000E+00 |
| Y5 | −6.129549E−10 | Y9 | −2.962804E−14 |
| X6 | −3.316779E−08 | X10 | −6.030361E−13 |
| X**5 * Y | 0.000000E+00 | X**9 * Y | 0.000000E+00 |
| X**4 * Y2 | 9.498635E−09 | X8 * Y**2 | −7.368710E−13 |
| X**3 * Y3 | 0.000000E+00 | X7 * Y**3 | 0.000000E+00 |
| X**2 * Y4 | 9.042084E−09 | X6 * Y**4 | 9.567750E−13 |
| X * Y5 | 0.000000E+00 | X5 * Y**5 | 0.000000E+00 |
| Y6 | −4.013470E−10 | X4 * Y**6 | 4.280494E−14 |
| X7 | 0.000000E+00 | X3 * Y**7 | 0.000000E+00 |
| X**6 * Y | −8.112755E−10 | X**2 * Y**8 | −7.143578E−15 |
| X**5 * Y**2 | 0.000000E+00 | X * Y**9 | 0.000000E+00 |
| X**4 * Y3 | 1.251040E−09 | Y10 | 3.858414E−15 |
| X**3 * Y**4 | 0.000000E+00 | N-Radius | 1.000000E+00 |

TABLE 5

Decenter of Surface #2 and #4 of Table 2, relative to Surface #1 of Table 2.

| Y DECENTER | Z DECENTER | ALPHA TILT |
|---|---|---|
| 6.775E+00 | 2.773E+01 | 7.711E+00 |

TABLE 6

Optical surface prescription of Surface #3 of Table 2.

| | | | |
|---|---|---|---|
| Y Radius | −6.744597E+01 | X**2 * Y**5 | −3.464751E−11 |
| Conic Constant | −1.258507E+00 | X * Y**6 | 0.000000E+00 |
| X | 0.000000E+00 | Y**7 | −8.246179E−12 |
| Y | 0.000000E+00 | X**8 | −2.087865E−11 |
| X2 | −1.300207E−03 | X7 * Y | 0.000000E+00 |
| X * Y | 0.000000E+00 | X**6 * Y**2 | 2.845323E−11 |
| Y2 | 4.658585E−04 | X5 * Y**3 | 0.000000E+00 |
| X3 | 0.000000E+00 | X4 * Y**4 | −5.043398E−12 |
| X**2 * Y | −1.758475E−05 | X**3 * Y**5 | 0.000000E+00 |
| X Y2 | 0.000000E+00 | X2 * Y**6 | 2.142939E−14 |
| Y**3 | −1.684923E−06 | X * Y**7 | 0.000000E+00 |
| X4 | −1.463720E−06 | Y8 | 1.607499E−12 |
| X**3 * Y | 0.000000E+00 | X**9 | 0.000000E+00 |
| X**2 * Y2 | −1.108359E−06 | X8 * Y | −1.922597E−12 |
| X * Y3 | 0.000000E+00 | X7 * Y**2 | 0.000000E+00 |
| Y4 | −1.098749E−07 | X6 * Y**3 | 1.100072E−13 |
| X5 | 0.000000E+00 | X5 * Y**4 | 0.000000E+00 |
| X**4 * Y | −7.146353E−08 | X**4 * Y**5 | −4.806130E−14 |
| X**3 * Y2 | 0.000000E+00 | X3 * Y**6 | 0.000000E+00 |
| X**2 * Y3 | −1.150619E−08 | X2 * Y**7 | −2.913177E−14 |
| X * Y**4 | 0.000000E+00 | X * Y**8 | 0.000000E+00 |
| Y5 | 5.911371E−09 | Y9 | 9.703717E−14 |
| X6 | −5.406591E−10 | X10 | 2.032150E−13 |
| X**5 * Y | 0.000000E+00 | X**9 * Y | 0.000000E+00 |
| X**4 * Y2 | −1.767107E−09 | X8 * Y**2 | −1.037107E−13 |
| X**3 * Y3 | 0.000000E+00 | X7 * Y**3 | 0.000000E+00 |
| X**2 * Y4 | −7.415334E−10 | X6 * Y**4 | 3.602862E−14 |
| X * Y5 | 0.000000E+00 | X5 * Y**5 | 0.000000E+00 |
| Y6 | −5.442400E−10 | X4 * Y**6 | −8.831469E−15 |
| X7 | 0.000000E+00 | X3 * Y**7 | 0.000000E+00 |
| X**6 * Y | 6.463414E−10 | X**2 * Y**8 | 2.178095E−15 |
| X**5 * Y**2 | 0.000000E+00 | X * Y**9 | 0.000000E+00 |
| X**4 * Y3 | 1.421597E−10 | Y10 | 1.784074E−15 |
| X**3 * Y**4 | 0.000000E+00 | N-Radius | 1.000000E+00 |

TABLE 7

Decenter of Surface #3 of Table 2 relative to Surface #1 of Table 2.

| Y DECENTER | Z DECENTER | ALPHA TILT |
|---|---|---|
| 1.329E+01 | 4.321E+01 | −8.856E+00 |

TABLE 8

Optical surface prescription of Surface #5 of Table 2.

| | | | |
|---|---|---|---|
| Y Radius | −8.300457E+02 | X**2 * Y**5 | 4.051880E−08 |
| Conic Constant | −9.675799E+00 | X * Y**6 | 0.000000E+00 |
| X | 0.000000E+00 | Y**7 | −3.973293E−09 |
| Y | 0.000000E+00 | X**8 | −1.881791E−10 |
| X2 | −1.798206E−04 | X7 * Y | 0.000000E+00 |
| X * Y | 0.000000E+00 | X**6 * Y**2 | 5.519986E−09 |
| Y2 | −2.606383E−03 | X5 * Y**3 | 0.000000E+00 |
| X3 | 0.000000E+00 | X4 * Y**4 | 3.822268E−09 |
| X**2 * Y | −7.767146E−05 | X**3 * Y**5 | 0.000000E+00 |
| X Y2 | 0.000000E+00 | X2 * Y**6 | −3.024448E−09 |
| Y**3 | −8.958581E−05 | X * Y**7 | 0.000000E+00 |
| X4 | 1.978414E−05 | Y8 | 2.673713E−11 |
| X**3 * Y | 0.000000E+00 | X**9 | 0.000000E+00 |
| X**2 * Y2 | 2.081156E−05 | X8 * Y | 1.006915E−10 |
| X * Y3 | 0.000000E+00 | X7 * Y**2 | 0.000000E+00 |
| Y4 | −1.073001E−06 | X6 * Y**3 | −2.945084E−10 |
| X5 | 0.000000E+00 | X5 * Y**4 | 0.000000E+00 |
| X**4 * Y | 2.585164E−07 | X**4 * Y**5 | 5.958040E−10 |
| X**3 * Y2 | 0.000000E+00 | X3 * Y**6 | 0.000000E+00 |
| X**2 * Y3 | −2.752516E−06 | X2 * Y**7 | −3.211903E−10 |
| X * Y**4 | 0.000000E+00 | X * Y**8 | 0.000000E+00 |
| Y5 | −1.470053E−06 | Y9 | 2.296303E−11 |
| X6 | −1.116386E−07 | X10 | 5.221834E−12 |
| X**5 * Y | 0.000000E+00 | X**9 * Y | 0.000000E+00 |
| X**4 * Y2 | −3.501439E−07 | X8 * Y**2 | 1.135044E−11 |
| X**3 * Y3 | 0.000000E+00 | X7 * Y**3 | 0.000000E+00 |
| X**2 * Y4 | 1.324057E−07 | X6 * Y**4 | −1.050621E−10 |
| X * Y5 | 0.000000E+00 | X5 * Y**5 | 0.000000E+00 |
| Y6 | −9.038017E−08 | X4 * Y**6 | 5.624902E−11 |
| X7 | 0.000000E+00 | X3 * Y**7 | 0.000000E+00 |
| X**6 * Y | 3.397174E−10 | X**2 * Y**8 | 5.369592E−12 |
| X**5 * Y**2 | 0.000000E+00 | X * Y**9 | 0.000000E+00 |
| X**4 * Y3 | −1.873966E−08 | Y10 | 2.497657E−12 |
| X**3 * Y**4 | 0.000000E+00 | N-Radius | 1.000000E+00 |

TABLE 9

Decenter of Surface #5 of Table 2 relative to Surface #1 of Table 2.

| Y DECENTER | Z DECENTER | ALPHA TILT |
|---|---|---|
| .427E+01 | 3.347E+01 | 7.230E+01 |

Turning to the prescription of the second field lens element 17, both surfaces of the field lens element 17 are aspheric surfaces. Additionally, Surface #29 (Table 2) of field lens element 17 has a kinoform diffractive optical feature which may be represented according to the following equation $$\varphi = Ar^2 + Br^4 + Cr^6 + Dr^8 + Er^{10},$$

where $\varphi$ is the phase function of the diffractive element, r is the radial distance, A through E are the 4th, 6th, 8th, 10th and 12th order phase coefficients, respectively. The surface prescriptions of second field lens element 17 are provide in Table 10-Table 12.

TABLE 10

Surface Prescription for Surface #29 of Table 2.

| | |
|---|---|
| Y Radius | 1.022230E+02 |
| Conic Constant (K) | 1.091191E+01 |
| 4th Order Coefficient (A) | 4.372314E−06 |
| 6th Order Coefficient (B) | −6.940740E−08 |
| 8th Order Coefficient (C) | 8.588869E−11 |
| 10th Order Coefficient (D) | 2.348571E−14 |
| 12th Order Coefficient (E) | −1.463306E−16 |

TABLE 11

Diffractive Optical Element Phase Data for Surface #29 of Table 2.

| | |
|---|---|
| Construction Wavelength (nm) | 525 |
| R**2 (HCO C1) | −1.295858E−03 |
| R**4 (HCO C2) | −3.879339E−07 |
| R**6 (HCO C3) | 8.494999E−09 |
| R**8 (HCO C4) | −1.771348E−13 |
| R**10 (HCO C5) | −3.584229E−15 |

TABLE 12

Surface Prescription for Surface #30 of Table 2.

| | |
|---|---|
| Y Radius | 6.164108E+01 |
| Conic Constant (K) | 9.828641E+00 |
| 4th Order Coefficient (A) | 5.898651E−05 |
| 6th Order Coefficient (B) | −2.951081E−07 |
| 8th Order Coefficient (C) | −3.440910E−10 |
| 10th Order Coefficient (D) | 1.785109E−13 |
| 12th Order Coefficient (E) | 2.803121E−15 |

TABLE 13

Optical surface prescription of Surface #5 of Table 3.

| | | | |
|---|---|---|---|
| Y Radius | −8.779024E+01 | X**2 * Y**5 | −8.011955E−11 |
| Conic Constant | −7.055198E+00 | X * Y**6 | 0.000000E+00 |
| X | 0.000000E+00 | Y**7 | 3.606142E−11 |
| Y | 0.000000E+00 | X**8 | 3.208020E−11 |
| X2 | −3.191225E−03 | X7 * Y | 0.000000E+00 |
| X * Y | 0.000000E+00 | X**6 * Y**2 | −2.180416E−11 |
| Y2 | 4.331992E−03 | X5 * Y**3 | 0.000000E+00 |
| X3 | 0.000000E+00 | X4 * Y**4 | −3.616135E−11 |
| X**2 * Y | −9.609025E−05 | X**3 * Y**5 | 0.000000E+00 |
| X Y2 | 0.000000E+00 | X2 * Y**6 | −5.893434E−12 |
| Y**3 | −2.432809E−05 | X * Y**7 | 0.000000E+00 |
| X4 | −2.955089E−06 | Y8 | 3.081069E−12 |
| X**3 * Y | 0.000000E+00 | X**9 | 0.000000E+00 |
| X**2 * Y2 | 2.096887E−07 | X8 * Y | 1.267096E−12 |
| X * Y3 | 0.000000E+00 | X7 * Y**2 | 0.000000E+00 |
| Y4 | −9.184356E−07 | X6 * Y**3 | −1.848104E−12 |
| X5 | 0.000000E+00 | X5 * Y**4 | 0.000000E+00 |
| X**4 * Y | 3.707556E−08 | X**4 * Y**5 | 5.208420E−14 |
| X**3 * Y2 | 0.000000E+00 | X3 * Y**6 | 0.000000E+00 |
| X**2 * Y3 | −1.535357E−07 | X2 * Y**7 | 1.198597E−13 |
| X * Y**4 | 0.000000E+00 | X * Y**8 | 0.000000E+00 |
| Y5 | −1.445904E−08 | Y9 | −6.834914E−14 |
| X6 | −4.440851E−09 | X10 | −1.706677E−14 |
| X**5 * Y | 0.000000E+00 | X**9 * Y | 0.000000E+00 |
| X**4 * Y2 | 1.686424E−09 | X8 * Y**2 | −1.614840E−14 |
| X**3 * Y3 | 0.000000E+00 | X7 * Y**3 | 0.000000E+00 |
| X**2 * Y4 | 6.770909E−09 | X6 * Y**4 | 8.739087E−14 |
| X * Y5 | 0.000000E+00 | X5 * Y**5 | 0.000000E+00 |
| Y6 | −3.713094E−10 | X4 * Y**6 | 3.940903E−15 |
| X7 | 0.000000E+00 | X3 * Y**7 | 0.000000E+00 |
| X**6 * Y | −1.316067E−10 | X**2 * Y**8 | 5.435162E−15 |
| X**5 * Y**2 | 0.000000E+00 | X * Y**9 | 0.000000E+00 |
| X**4 * Y3 | 7.924387E−10 | Y10 | −2.259169E−15 |
| X**3 * Y**4 | 0.000000E+00 | N-Radius | 1.000000E+00 |

TABLE 14

Decenter of Surface #5 relative to Surface #1 of Table 3.

| Y DECENTER | Z DECENTER | ALPHA TILT |
|---|---|---|
| 3.358E+00 | 4.900E+01 | 6.765E+00 |

Alternative Exemplary Design without Cylindrical Lens

In the designs of FIGS. 3A, 3B above, an optional cylindrical lens 13 has been included with the free-form compensator 14 to help minimize aberrations and distortion. An alternative design is also provided without the cylindrical lens 13, in which the virtual display path is the same as shown in FIG. 3B and Table 2. The only difference among the remaining surfaces of the see-through path in the absence of the cylindrical lens 13 is the eyepiece/compensator surface S2 (Surface #5 in the optical see-through path of Table 3). In Table 15, Surfaces #2 and #3 are eyepiece surfaces S1 and S3, modeled the same as in the virtual display path. Surfaces #4-5 describe the free-form compensator 14. Surface #4 is a exact replica of Surface #3.

TABLE 15

Alternative eyepiece optics prescription without cylindrical lens.

| Surface | Type | Y Radius | X Radius | Thickness | Material | Refract Mode |
|---|---|---|---|---|---|---|
| Object | Sphere | Infinity | Infinity | −666.700 | | Refract |
| 1 (Stop) | Sphere | Infinity | Infinity | 0.000 | | Refract |
| 2 | XY Polynomial | −185.496 | −185.496 | 0.000 | PMMA | Refract |
| 3 | XY Polynomial | −67.446 | −67.446 | 0.000 | PMMA | Refract |
| 4 | XY Polynomial | −67.446 | −67.446 | 0.000 | PMMA | Refract |
| 5 | XY Polynomial | −492.346 | −492.346 | 0.000 | | Refract |
| Image | Sphere | Infinity | Infinity | 0.000 | | Refract |

TABLE 16

Optical surface prescription of Surface #5 of Table 15.

| | | | |
|---|---|---|---|
| Y Radius | −4.923462E+02 | X**2 * Y**5 | −1.476237E−10 |
| Conic Constant | 3.982960E+00 | X * Y**6 | 0.000000E+00 |
| X | 0.000000E+00 | Y**7 | 2.044705E−11 |
| Y | 0.000000E+00 | X**8 | 2.971746E−11 |
| X2 | −3.001720E−03 | X7 * Y | 0.000000E+00 |
| X * Y | 0.000000E+00 | X**6 * Y**2 | −6.199724E−12 |
| Y2 | −5.233825E−04 | X5 * Y**3 | 0.000000E+00 |
| X3 | 0.000000E+00 | X4 * Y**4 | −2.279723E−11 |
| X**2 * Y | −6.009699E−05 | X**3 * Y**5 | 0.000000E+00 |
| X Y2 | 0.000000E+00 | X2 * Y**6 | −1.041364E−12 |
| Y**3 | −2.244921E−05 | X * Y**7 | 0.000000E+00 |
| X4 | −6.379076E−07 | Y8 | 1.125487E−12 |
| X**3 * Y | 0.000000E+00 | X**9 | 0.000000E+00 |
| X**2 * Y2 | 2.968752E−06 | X8 * Y | 1.210373E−12 |
| X * Y3 | 0.000000E+00 | X7 * Y**2 | 0.000000E+00 |
| Y4 | 3.771516E−07 | X6 * Y**3 | −1.331110E−12 |
| X5 | 0.000000E+00 | X5 * Y**4 | 0.000000E+00 |
| X**4 * Y | 5.359865E−08 | X**4 * Y**5 | −9.781602E−14 |
| X**3 * Y2 | 0.000000E+00 | X3 * Y**6 | 0.000000E+00 |
| X**2 * Y3 | −1.965407E−07 | X2 * Y**7 | 4.515428E−13 |
| X * Y**4 | 0.000000E+00 | X * Y**8 | 0.000000E+00 |
| Y5 | −7.301859E−09 | Y9 | −5.050786E−14 |
| X6 | −6.841269E−09 | X10 | −1.058279E−14 |
| X**5 * Y | 0.000000E+00 | X**9 * Y | 0.000000E+00 |
| X**4 * Y2 | −2.507411E−09 | X8 * Y**2 | −2.975833E−14 |
| X**3 * Y3 | 0.000000E+00 | X7 * Y**3 | 0.000000E+00 |
| X**2 * Y4 | 4.627014E−10 | X6 * Y**4 | 6.309574E−14 |
| X * Y5 | 0.000000E+00 | X5 * Y**5 | 0.000000E+00 |
| Y6 | −4.841692E−10 | X4 * Y**6 | 1.214005E−15 |
| X7 | 0.000000E+00 | X3 * Y**7 | 0.000000E+00 |
| X**6 * Y | −3.343485E−10 | X**2 * Y**8 | 1.180350E−14 |
| X**5 * Y**2 | 0.000000E+00 | X * Y**9 | 0.000000E+00 |
| X**4 * Y3 | 7.999315E−10 | Y10 | −5.938353E−16 |
| X**3 * Y**4 | 0.000000E+00 | N-Radius | 1.000000E+00 |

TABLE 17

Decenter of Surface #5 of Table 15 relative to Surface #1 of Table 15.

| Y DECENTER | Z DECENTER | ALPHA TILT |
|---|---|---|
| 4.618E+00 | 4.853E+01 | 7.007E+00 |

Prototype of System of FIG. 3B

A prototype of the multi-focal-plane display system 200 of FIG. 3B was built with off-the-shelf lenses and customized optics, 3D views of which are provided in FIGS. 6A, 6B. The system 200 was folded to avoid conflicting with the viewer's head. Custom electronics were also developed to control and synchronize the display images on the DMD 60 (LUXBEAM® 4500, VISITECH, Drammen, Norway.), the illumination of the LED (not shown), and focal-plane switching of the deformable mirror 80 (OKO® Technologies MMDM10-1-focus, Flexible Optical B.V., Rijswijk, Netherlands).

A continuous 3D scene was rendered which was composed of a slanted planar object and a green floor grid, both extending from 0 to 2.5 diopters. The scene was decomposed onto 6 focal planes, placed at 3 diopter, 2.4 diopter, 1.8 diopter, 1.2 diopter, 0.6 diopter and 0 diopter, based on the targets' depth values, and a depth-fusing technique was used to blend the 6 focal planes into a smooth continuum. The whole 3D scene was refreshed at about 60 Hz; thus, flickering was not visible. FIG. 7A shows the actual 6-focal-plane scene as seen through the system; the image was sharp and had very low distortion. Without special algorithms, the pixels on different focal planes overlap and fuse smoothly due to the constant field of view design. In addition, a camera lens with shallow depth of field was used and manually focused at different parts of the scene. In FIG. 7B, the resolution target was displayed on the back wall, and the camera was focused at about 2 m. The near end of the floor grid was out of focus and the back grids as well as the logos were in sharp focus. In FIG. 7C, the resolution target was displayed on the front focal plane, the camera was focused at 30 cm, and now the near scene was in focus and the content on the back was blurred. Thus, the prototype was demonstrated to be capable of rendering 6 or more focal planes of high quality, high resolution color images at a flickering-free speed. It also had very good optical see-through performance for augmented reality applications, and has the potentially to provide higher depth perception accuracy, higher stereoacuity, and lower user fatigue.

Alternative Exemplary Tunable Lens

In another of its aspects, the present invention provides an exemplary multi-focal-plane display system 300 combining high-speed display technologies, such as Liquid Crystal on Silicon (LCOS) and Ferroelectric Liquid Crystal On Silicon (FLCoS) and a high-speed active refractive optical element, such as an electrical tunable lens 380. The Specific design is based on a 0.8" WXGA LCOS/FLCOS display 360 and a 10 mm aperture electrical tunable lens 380 (Optotune EL-10-30, Optotune AG, Dietikon, Switzerland.)). The tunable lens 380 changes shape when electrical current flows through the lens 380 to produce a change in optical power. The Optotune lens 380 has a response time of about 2.5 ms and therefore potentially can be used in multi-focal-plane displays.

TABLE 18

Design specification for tunable lens system.

| | |
|---|---|
| Microdisplay | 0.8" LCOS/FLCOS WXGA, 14, µm pixel |
| Tunable Lens | 10 mm aperture, 12 diopter, focus range |
| Virtual Display Field of view | 50° (43.6° H x 26.4° V) |
| Pupil size | 10 mm |
| Eye Clearance | 20 mm (accommodates low-profile glasses) |
| Image Quality (DMD space) | MTF > 0.2 at 36 lp/mm (5 mm pupil) |
| Display Distortion | < 2.0 % |
| Virtual Image Distance | 33 cm~Infinity |
| f-number | 2.2 |

Figure 10B:
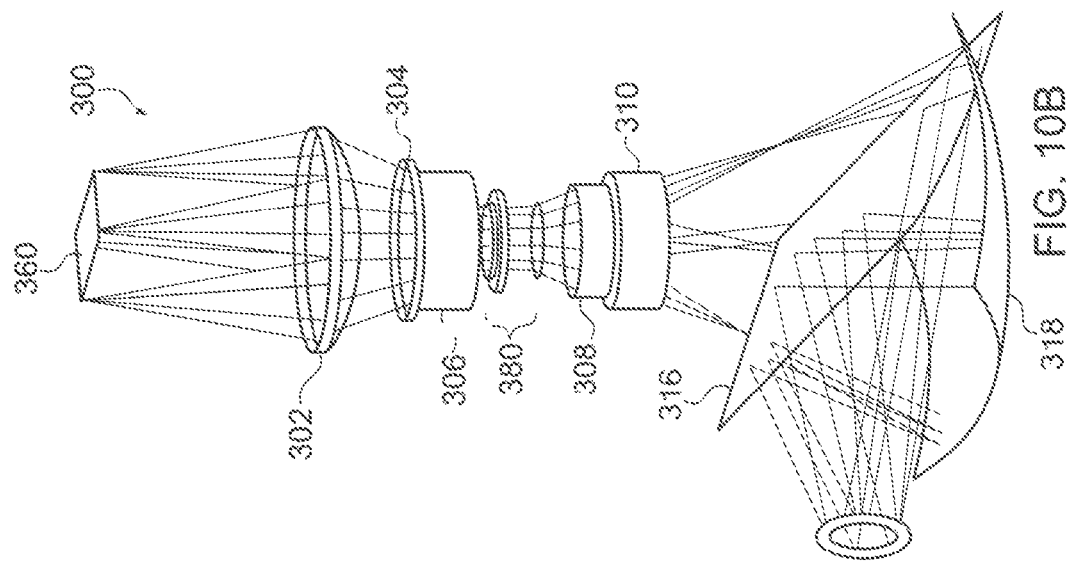
FIGS. 10A, 10B schematically illustrate 2D and 3D layouts, respectively, of the virtual display optics of a further exemplary display system in accordance with the present invention.
Figure 10A:
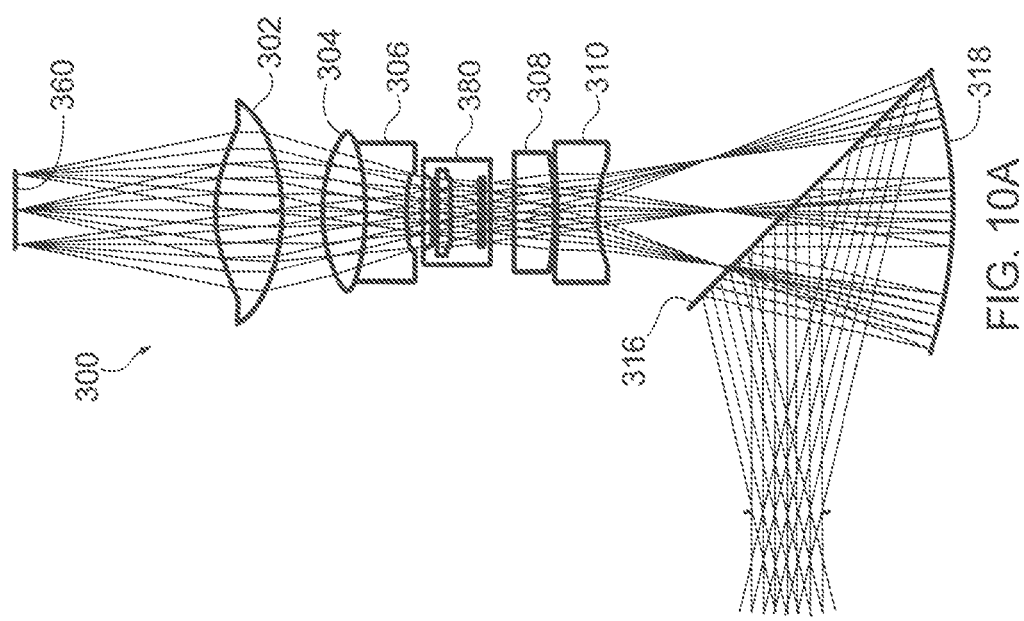
Figure 11:
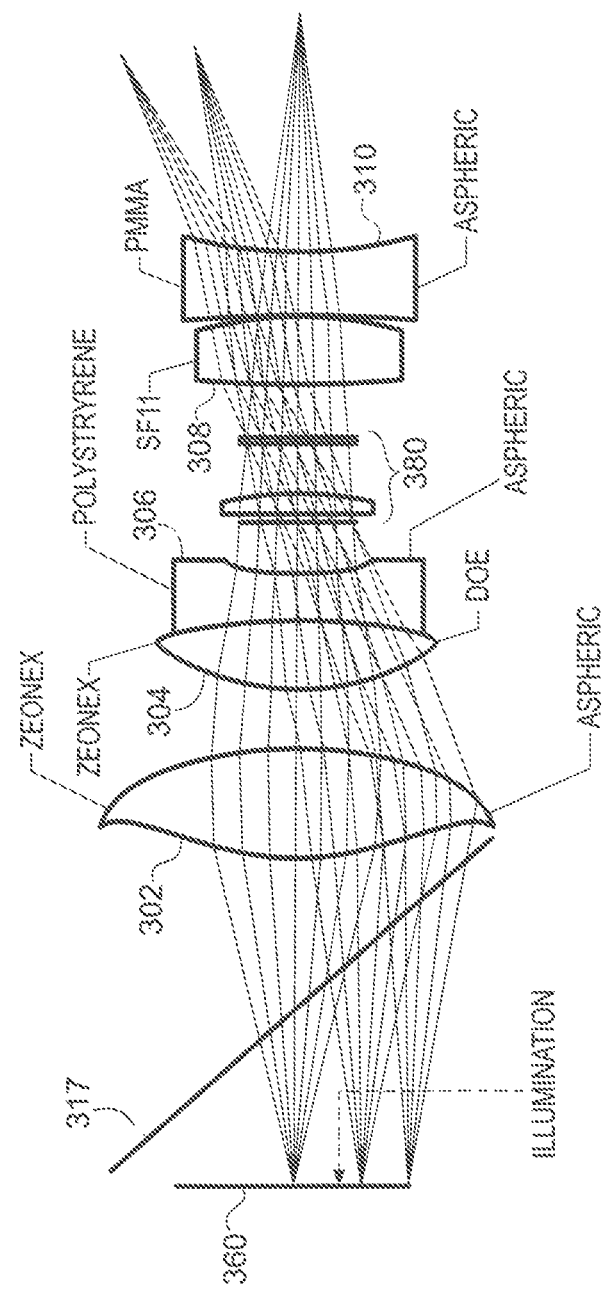
FIG. 11 schematically illustrates a 2D layout and element descriptions of the relay lens group of FIG. 10A along with an optional display illumination path.
Figure 12A:
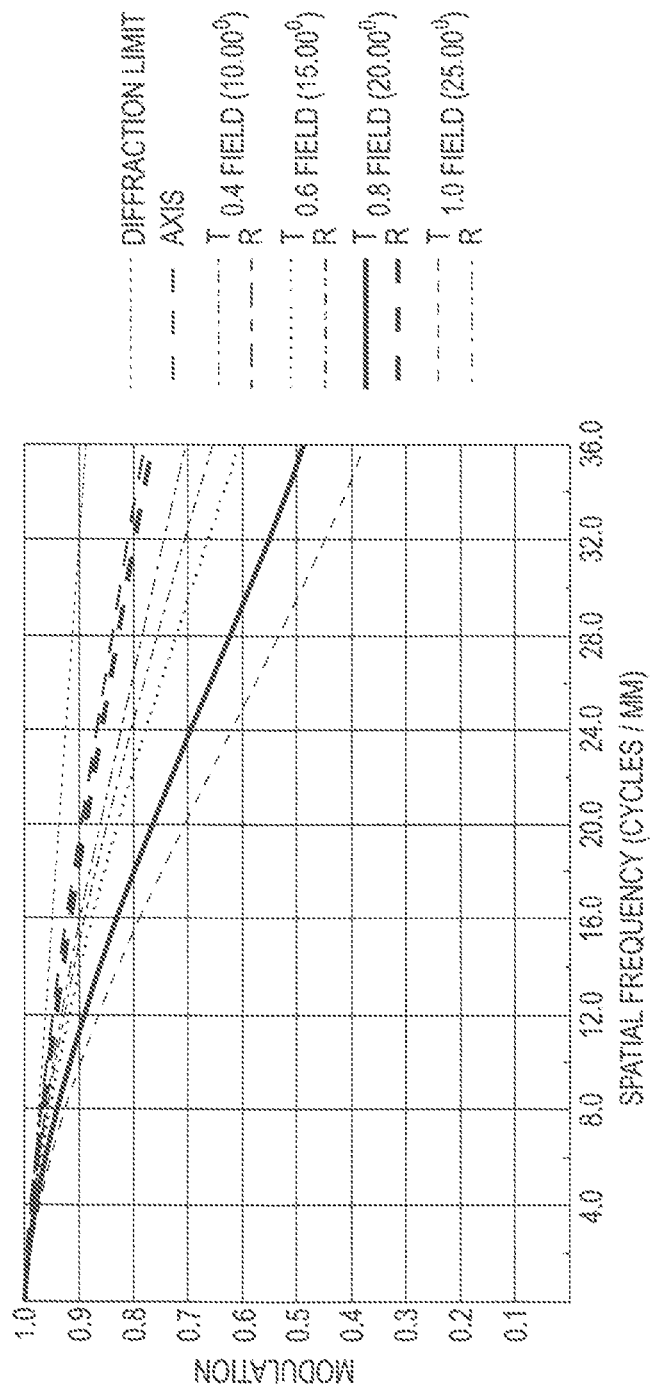
FIGS. 12A, 12B illustrate polychromatic MTF and field curves, respectively, of the system of FIGS. 10A-11.
Figure 12B:
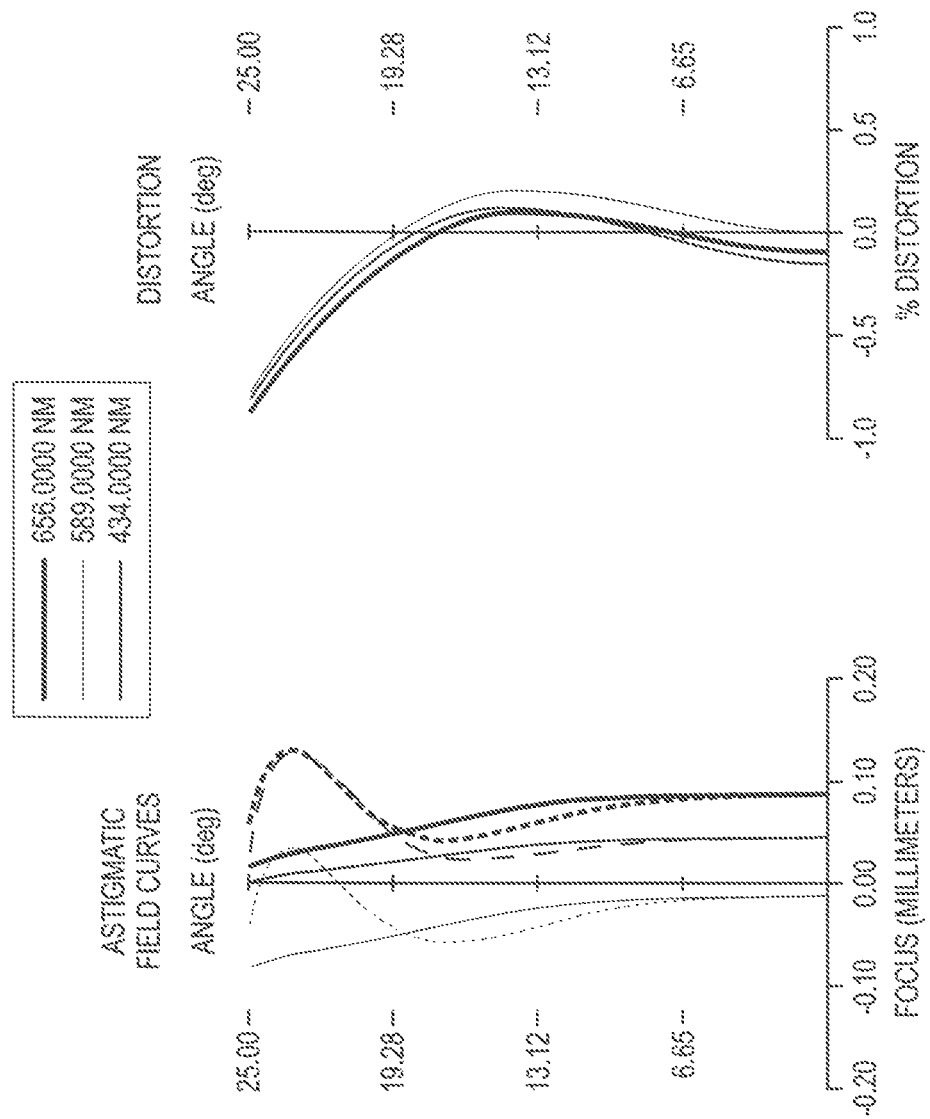

The final layout of the design is shown in FIGS. 10A-11. A relay lens group (lenses 302, 304, 306, 380, 308, 310) relays the image to a spherical mirror 318, which acts as an eyepiece and forms a virtual image for a user. Optionally, the mirror 318 may be aspherical. A beamsplitter 316 is used to enable see-through capability. The tunable lens 380 may provide the system stop and the system may be telecentric to the microdisplay 360 due to the requirements of LCOS/FLCoS. Enough space is also given for an illumination beamsplitter 317, FIG. 11. The prescription of the system 300 is provided in Table 19-Table 26. (In Table 19, surfaces #9-12 model the Optotune electric tunable lens 380.) The performance of the system is illustrated in FIGS. 12A, 12B.

TABLE 19

Tunable lens system prescription.

| Element number used in figures | Surface No. | Surface Type | Y Radius | Thickness | Material | Refract Mode |
|---|---|---|---|---|---|---|
| | 1 (Stop) | Sphere | Infinity | 44.000 | | Refract |
| | 2 | Sphere | Infinity | −24.000 | | Reflect |
| 318 | 3 | Sphere | 68.000 | 34.000 | | Reflect |
| 316 | 4 | Sphere | Infinity | 17.371 | | Refract |
| 310 | 5 | Asphere | −23.777 | 6.000 | PMMA | Refract |
| | 6 | Asphere | 363.193 | 0.100 | | Refract |
| 308 | 7 | Sphere | 39.587 | 6.000 | NSF11 | Refract |
| | 8 | Sphere | −119.109 | 4.385 | | Refract |
| 380 | 9 | Sphere | Infinity | 0.500 | BK7 | Refract |
| 380 | 10 | Sphere | Infinity | 4.377 | | Refract |
| 380 | 11 | Sphere | 30.270 | 2.023 | 'OL1024' | Refract |
| 380 | 12 | Sphere | Infinity | 0.500 | BK7 | Refract |
| | 13 | Sphere | Infinity | 3.724 | | Refract |
| 306 | 14 | Asphere | −24.004 | 5.999 | Polystyrene | Refract |
| | 15 | Asphere | 27.079 | 0.251 | | Refract |
| 304 | 16 | Sphere | 38.710 | 5.944 | Zeonex ZE48R | Refract |
| | 17 | Sphere | −21.557 | 5.631 | | Refract |
| 302 | 18 | Asphere | 33.959 | 9.698 | Zeonex ZE48R | Refract |
| | 19 | Asphere | −21.555 | 29.000 | | Refract |

TABLE 20

Surface Prescription for Surface #5 of Table 19.

| | |
|---|---|
| Y Radius | −23.777 |
| Conic Constant (K) | 2.040996E+00 |
| 4th Order Coefficient (A) | 1.385342E−04 |
| 6th Order Coefficient (B) | −1.022594E−06 |
| 8th Order Coefficient (C) | 8.784855E−09 |
| 10th Order Coefficient (D) | −2.891372E−11 |

TABLE 21

Surface Prescription for Surface #6 of Table 19.

| | |
|---|---|
| Y Radius | 363.193 |
| Conic Constant (K) | −1.060606E+01 |
| 4th Order Coefficient (A) | 6.247531E−05 |
| 6th Order Coefficient (B) | −8.622953E−07 |
| 8th Order Coefficient (C) | 9.037984E−09 |
| 10th Order Coefficient (D) | −4.513968E−11 |

TABLE 22

Surface Prescription for Surface #14 of Table 19.

| | |
|---|---|
| Y Radius | −24.004 |
| Conic Constant (K) | 2.609562E+00 |
| 4th Order Coefficient (A) | −1.053175E−04 |
| 6th Order Coefficient (B) | 3.126004E−07 |
| 8th Order Coefficient (C) | −2.716200E−08 |
| 10th Order Coefficient (D) | 2.112687E−10 |

TABLE 23

Surface Prescription for Surface #15 of Table 19.

| | |
|---|---|
| Y Radius | 27.079 |
| Conic Constant (K) | −6.178694E+00 |
| 4th Order Coefficient (A) | −1.075797E−05 |
| 6th Order Coefficient (B) | −1.383769E−07 |
| 8th Order Coefficient (C) | 4.641779E−10 |
| 10th Order Coefficient (D) | 9.831856E−13 |

TABLE 24

Surface Prescription for Surface #16 of Table 19.

| | |
|---|---|
| Construction (nm) Wavelength | 589 |
| R**2 (HCO C1) | −1.543448E−03 |
| R**4 (HCO C2) | 7.864956E−06 |
| R**6 (HCO C3) | −1.080042E−07 |
| R**8 (HCO C4) | 1.272753E−09 |
| R**10 (HCO C5) | −5.114979E−12 |

TABLE 25

Surface Prescription for Surface #18 of Table 19.

| | |
|---|---|
| Y Radius | 33.959 |
| Conic Constant (K) | 2.310849E+00 |
| 4th Order Coefficient (A) | 4.222932E−06 |
| 6th Order Coefficient (B) | −2.501786E−08 |
| 8th Order Coefficient (C) | 3.154900E−11 |
| 10th Order Coefficient (D) | 2.517705E−13 |

TABLE 26

Surface Prescription for Surface #19 of Table 19.

| | |
|---|---|
| Y Radius | −21.555 |
| Conic Constant (K) | −1.347355E+00 |
| 4th Order Coefficient (A) | 1.944341E−05 |
| 6th Order Coefficient (B) | 3.600425E−08 |
| 8th Order Coefficient (C) | −1.998220E−11 |
| 10th Order Coefficient (D) | 6.798072E−13 |

Overall Design Considerations

In another of its aspects the present invention relates to new criteria for determining depth-fused display (DFD) system design parameters. The optical quality of a fused pixel in DFD displays is quantified by the point spread function (PSF) of its retinal image, or, equivalently, by the modulation transfer function (MTF) which is characterized by the ratio of the contrast modulation of the retinal image to that of a sinusoidal object on the 3D display. For instance, when the eye is accommodated at a rendered depth, z, the PSF of a fused pixel, $PSF_{12}$, by two pixels on a pair of adjacent focal planes located at $z_1$ and $z_2$, respectively, may be described as the weighted sum of the PSFs from the front and the back pixels as:

$$PSF_{12}(z) = w_1(z) \frac{PSF_1(z, z_1)}{\iint_{x,y} PSF_1(z, z_1) dx dy} + w_2(z) \frac{PSF_2(z, z_2)}{\iint_{x,y} PSF_2(z, z_2) dx dy}, \quad (1)$$

where $PSF_1(z, z_1)$ and $PSF_2(z, z_2)$ are the point spread functions of the front and back pixels when the eye is accommodated at distance z. The PSFs in Eq. (1) are normalized so that front and back pixels have the same luminance before calculating the weighted sum. $w_1$ and $w_2$ are the depth-weighted fusing functions modulating the luminance of the front and back pixels and typically $w_1(z)+w_2(z)=1$ is enforced so that the total luminance of the fused image stays the same when the simulated depth changes. The MTF of the display can then be calculated via Fourier Transform of $PSF_{12}(z)$.

Figure 8A:
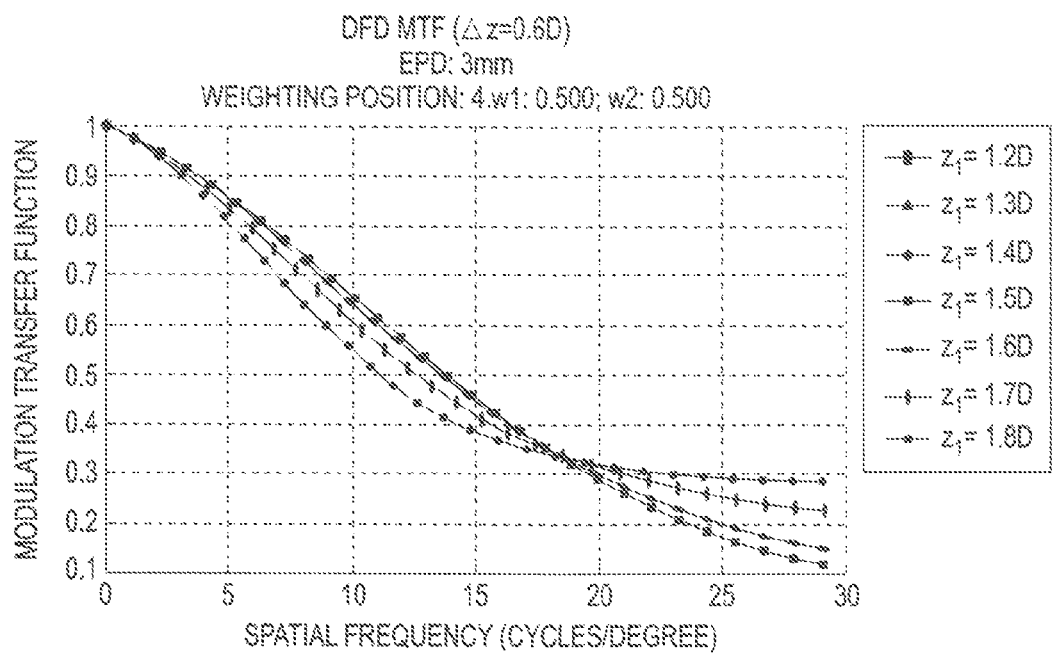
FIG. 8A illustrates a retinal image MTF as a function of accommodations in a dual-focal-plane display, with two focal planes placed at 1.2D and 1.8D, respectively, and with a luminance ratio of 1:1.
Figure 8B:
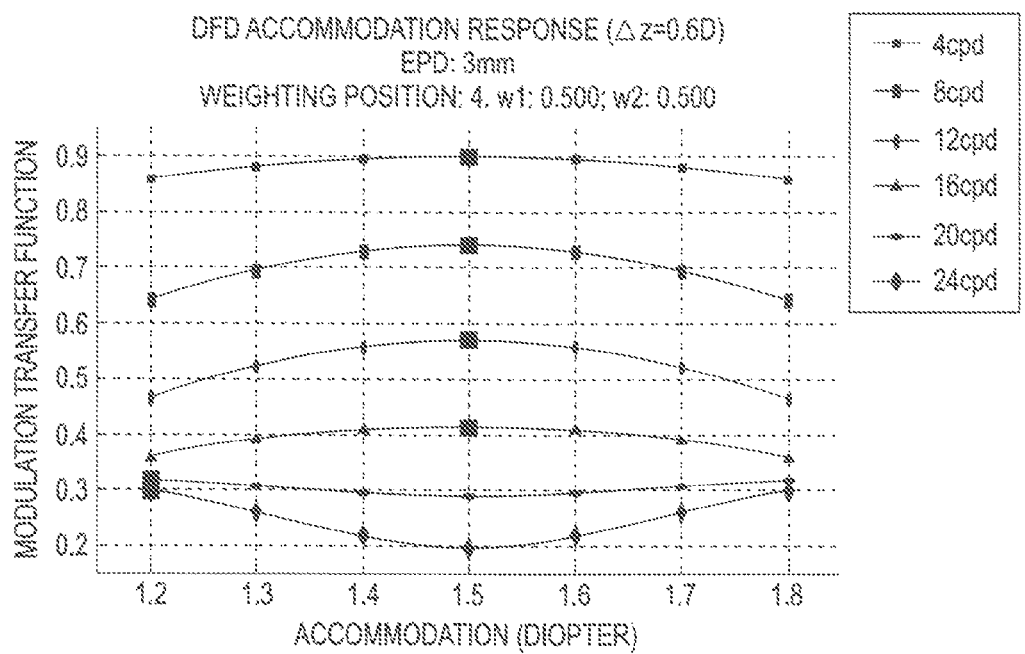
FIG. 8B illustrates a retinal image contrast as a function of accommodation showing the contrast gradient for different spatial frequencies.

An example of the MTF plots of simulated retinal images of a dual-focal-plane DFD display is shown in FIG. 8A. In the simulation, the two focal planes were placed at 1.2 diopters and 1.8 diopters, respectively, and the luminance ratio between the two focal planes was 1:1, indicating that the fused pixel was being simulated at the dioptric midpoint of the front and back focal planes, i.e., 1.5 diopters. To concentrate on the effects of depth fusion, an eye model was selected with a 3 mm pupil, with all residual aberrations removed. FIG. 8A shows how the MTF of the retinal image changes as the eye accommodates at various positions between the two focal planes. FIG. 8B shows the contrast gradient as a function of eye accommodation distance for different spatial frequencies, and the peak contrast for each frequency was marked by a black square marker. A transition frequency of around 17 cycles/degree (cpd) is observed from both plots. Below that transition frequency, the MTF of the retinal image is maximized at the dioptric midpoint of 1.5 diopters, which is the simulated depth by the 1:1 luminance ratio in the dual-focal plane system. Furthermore, as the eye approaches the simulated depth from either the far or near focal planes, the MTF values increase smoothly, providing the appropriate contrast gradient required for driving the eye accommodation. For frequencies higher than 17 cpd, however, the contrast of the fused pixel is always highest when the eye is accommodated at or near the physical focal planes, meaning that the contrast gradient has the tendency to drive the accommodation away from the simulated pixel depth, therefore creating a conflict accommodation cue.

Figure 9A:
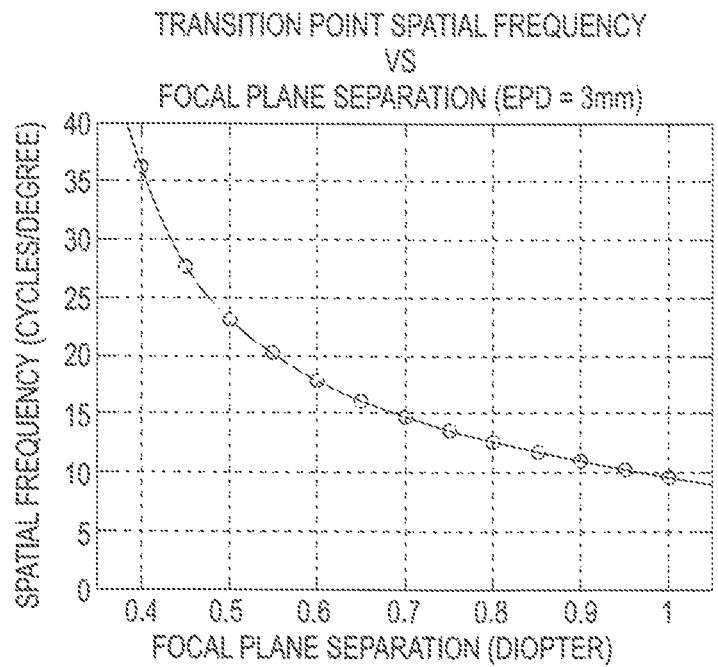
FIGS. 9A-9B illustrate that the spatial frequency of a transition point decreases when the focal plane separation increases and when the eye pupil size increases, respectively.
Figure 9B:
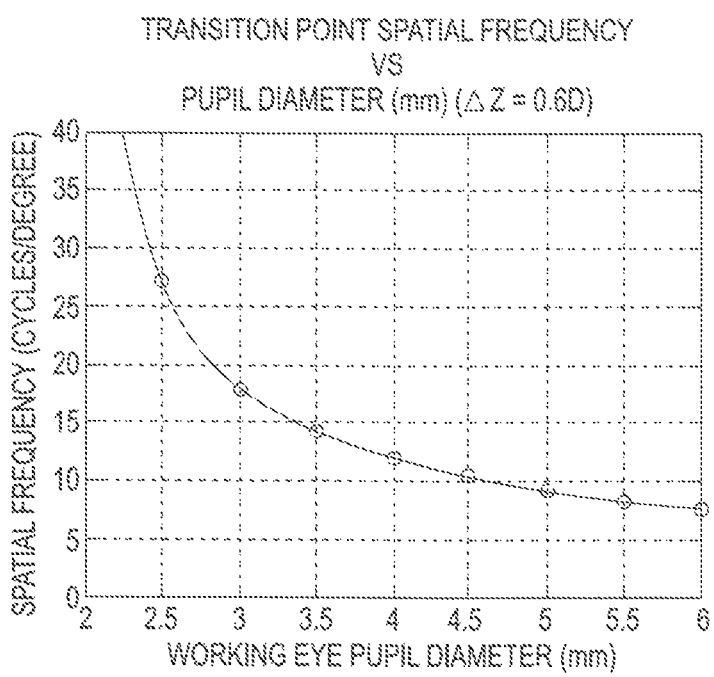

FIGS. 9A, 9B show how the transition frequency varies as a function of focal plane separation and as a function of pupil size. FIG. 9A assumes a 3 mm eye pupil, and FIG. 9B assumes a constant focal plane separation of 0.6 diopters. The results suggest that the smaller the focal plane separation and the smaller the designed eye pupil size, the higher in frequency the transition point is. Therefore a critical criterion for designing a DFD display is that the focal plane separation and the display's working pupil size should be determined such that the contrast gradient reverse point is higher than the system's cut-off frequency to avoid presenting a conflicting accommodation cue to the viewer. For instance, a 0.6-diopter separation between adjacent focal planes can be considered adequate for a DFD display affording an angular resolution of 1.8 arc minutes per pixel (approximately a spatial frequency of 17 cpd) and luminance greater than 10 cd/m². The stimulation of 10 cd/m² display luminance leads to approximately a 3 mm eye pupil diameter. A 0.45-diopter spacing or smaller would be desired for displays affording an angular resolution of 1 arc minute per pixel (i.e., 30 cpd). The smaller the angular resolution per pixel or the lower the image brightness, the smaller the required focal-plane separation would be.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A virtual display system with addressable focus cues, comprising:
    a microdisplay for providing a virtual image for display to a user;
    a reflective active optical element configured to provide a variable optical power;
    a double-telecentric relay lens, with focal length $f_1$, disposed along an optical path between the microdisplay and active optical element;
    a beamsplitter disposed along the optical path between the microdisplay and the active optical element at an orientation to receive optical radiation from the active optical element; and
    a see-through eyepiece, with focal length $f_{eye}$, comprising a selected surface configured to receive optical radiation from the beamsplitter and reflect the received radiation to an exit pupil of the system to provide a virtual display path which relays a stop of the virtual display system defined by the reflective active optical element therewith to form the exit pupil, and wherein the selected surface is also configured to receive optical radiation from a source other than the microdisplay and to transmit such optical radiation to the exit pupil to provide a see-through optical path,
    wherein the ratio of the size of the exit pupil, $D_{xp}$ to the size of the reflective active optical element, $D_{DMMD}$, is $$D_{XP} = \frac{D_{DMMD}}{f_1 / f_{eye}}.$$

2. The display system of claim 1, wherein the eyepiece comprises a freeform prism shape.

3. The display system of claim 1, wherein the eyepiece comprises a first surface configured to receive and refract optical radiation from the beamsplitter and comprises a second surface configured to receive the refracted optical radiation from the first surface, the second surface configured to reflect the optical radiation to the selected surface of the eyepiece.

4. The display system of claim 3, wherein the second surface is configured to total internally reflect the optical radiation.

5. The display system of claim 1, wherein one or more of the surfaces of the eyepiece comprise a rotationally asymmetric surface.

6. The display system of claim 1, comprising an eyepiece compensator disposed along the see-through path adjacent the selected surface of the eyepiece.

7. The display system of claim 1, comprising a field lens disposed adjacent the microdisplay configured to provide magnification of the display.

8. The display system of claim 7, wherein the field lens comprises an aspheric surface and a diffractive optical feature.

9. The display system of claim 1, wherein the relay lens and active optical element are configured to provide a folded, doubly telecentric system.

* * * * *